United States Patent
Capps et al.

(10) Patent No.: US 10,866,956 B2
(45) Date of Patent: Dec. 15, 2020

(54) OPTIMIZING USER TIME AND RESOURCES

(71) Applicant: Pearson Education, Inc., New York, NY (US)

(72) Inventors: Neena Capps, Colorado Springs, CO (US); Gailene Nelson, Lafayette, CA (US)

(73) Assignee: PEARSON EDUCATION, INC., New York, NY (US)

( * ) Notice: Subject to any disclaimer, the term of this patent is extended or adjusted under 35 U.S.C. 154(b) by 374 days.

(21) Appl. No.: 15/782,698

(22) Filed: Oct. 12, 2017

(65) Prior Publication Data

US 2019/0114346 A1 Apr. 18, 2019

(51) Int. Cl.
*G06F 16/242* (2019.01)
*H04L 29/08* (2006.01)
*G06F 16/2457* (2019.01)
*G09B 7/00* (2006.01)

(52) U.S. Cl.
CPC .... *G06F 16/24575* (2019.01); *G06F 16/2428* (2019.01); *G06F 16/24578* (2019.01); *G09B 7/00* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 10,255,571 B2 | 4/2019 | Cantor et al. | |
| 2008/0254432 A1 | 10/2008 | Woolf et al. | |
| 2009/0162827 A1* | 6/2009 | Benson | G06F 16/285 434/350 |
| 2013/0330704 A1 | 12/2013 | Creamer et al. | |
| 2014/0193791 A1 | 7/2014 | McBride et al. | |
| 2014/0220540 A1 | 8/2014 | Burgin et al. | |
| 2015/0010894 A1 | 1/2015 | Morisset | |
| 2016/0012744 A1* | 1/2016 | Rogers | G09B 5/00 434/350 |
| 2016/0098939 A1 | 4/2016 | Rogers et al. | |
| 2016/0148515 A1 | 5/2016 | Augusto et al. | |
| 2016/0180248 A1 | 6/2016 | Regan | |
| 2016/0196534 A1 | 7/2016 | Jarrett et al. | |
| 2016/0220867 A1 | 8/2016 | Flaherty | |
| 2017/0098380 A1 | 4/2017 | Mihai et al. | |
| 2017/0294134 A1 | 10/2017 | Angel et al. | |
| 2018/0090022 A1 | 3/2018 | Bouillet et al. | |
| 2018/0144653 A1 | 5/2018 | Ferreira | |
| 2018/0268341 A1 | 9/2018 | Rini et al. | |

* cited by examiner

*Primary Examiner* — Tuankhanh D Phan
(74) *Attorney, Agent, or Firm* — Quarles & Brady LLP

(57) ABSTRACT

Systems and methods of the present invention provide for a server computer to receive, from a client GUI a request for a recommendation, the request including a designation of available time. The server then queries activity data for the user to identify an objective category associated with the user activity and an assessment score for the user below a defined threshold. The server then queries a recommended activity data, tagged with the identified category and a time requirement equal to or less than the designation of available time. The server then generates a GUI including a report of the assessment score below the threshold and the recommended activity.

20 Claims, 26 Drawing Sheets

Learner Dashboard - Jane Doe

Current Status: John Doe Current Class Score: 65% (.65, D)

| Activity (Type) | Learning Objective | Score | Time | Weight |
|---|---|---|---|---|
| Chapter 1, Section 1 | Learn the concept of mean, median, mode | n/a | .25 hours | 3% (.03) |
| Assignment (Ch. 1.1) | Learn the concept of mean, median, mode | 80% (.8) | .8 hours | 5% (.05) |
| Tiny Quiz 1 (Ch. 1.1) | Learn the concept of mean, median, mode | 50% (.5) | .5 hours | 5% (.05) |
| Exam 1 (Ch. 1) | Learn the concept of mean, median, mode | 60% (.6) | .5 hours | 10% (.1) |
| Chapter 1, Section 2 | How to calculate the average | n/a | .25 hours | 3% (.03) |

Hello Jane Doe! Welcome to Effort Optimizer/Maximizer. Please enter the number of additional study hours you can dedicate to this course.

Course: [ Statistics ▽ ]     Additional study time available to invest:

Preferred Material Type: [ Electronic Textbook ▽ ]     Hours: [ 1 ]   Minutes: [ 15 ]

Video
Virtual Reality
Test, Quiz
Other Assessment

[ Submit for Recommendations ]

FIG. 9

| File Edit Tools | | | |
|---|---|---|---|

Learner Dashboard - Jane Doe

Recommendations (ordered by most to least optimal return on investment):

| Recommendation | Learning Objective | Time Needed | Weight |
|---|---|---|---|
| Exam 1.1.2 | Learn the concept of mean, Median, and mode | .9 hours | 10% (.1) |
| Quick Review 1 | Learn the concept of mean, Median, and mode | .25 hours | 5% (.05) |
| Assignment 1.2 | Learn the concept of mean, Median, and mode | .7 hours | 5% (.05) |
| Tiny Quiz 1.2 | Learn the concept of mean, Median, and mode | .4 hours | 5% (.05) |
| Assignment 1.2.1 | How to calculate the average | .3 hours | 5% (.05) |

Jane Doe's projected score with extra effort:
By completing the recommendations above, your score may improve anywhere between 70% (C-) and 88% (B+) See details

Note: Our system detected one or more recommendations with a greater return on investment, but will require more time than you have allotted. Click here to see these recommendations and update your available time.

Save/email these results to: janedoe@myaccount.com; statsinstuctor@school.com  [Submit]

Learner Dashboard - Jane Doe

Current Status: John Doe Current Class Score: 65% (.65, D)

| Activity (Type) | Learning Objective | Score | Time | Weight |
| --- | --- | --- | --- | --- |
| Chapter 1, Section 1 | Learn the concept of mean, median, mode | n/a | .25 hours | 3% (.03) |
| Assignment (Ch. 1.1) | Learn the concept of mean, median, mode | 80% (.8) | .8 hours | 5% (.05) |
| Tiny Quiz 1 (Ch. 1.1) | Learn the concept of mean, median, mode | 50% (.5) | .5 hours | 5% (.05) |
| Exam 1 (Ch. 1) | Learn the concept of mean, median, mode | 60% (.6) | .5 hours | 10% (.1) |
| Chapter 1, Section 2 | How to calculate the average | n/a | .25 hours | 3% (.03) |

Hello Jane Doe! Welcome to Grade Simulator. Please select a course and enter a desired grade.

Course: Statistics ▽   Desired Grade: B+ (87-89%) ▽

B (83-86%)
B- (80-82%)
C+ (77-79%)
C (73-76%)

Submit for Recommendations

FIG. 12

Learner Dashboard - Jane Doe

Recommendations (ordered by most to least optimal return on investment):

| Recommendation | Learning Objective | Time Needed | Weight |
| --- | --- | --- | --- |
| Exam 1.1.2 | Learn the concept of mean, Median, and mode | .9 hours | 10% (.1) |
| Quick Review 1 | Learn the concept of mean, Median, and mode | .25 hours | 5% (.05) |
| Assignment 1.2 | Learn the concept of mean, Median, and mode | .7 hours | 5% (.05) |
| Tiny Quiz 1.2 | Learn the concept of mean, Median, and mode | .4 hours | 5% (.05) |
| Assignment 1.2.1 | How to calculate the average | .3 hours | 5% (.05) |

Jane Doe's Analysis - You can do it:
To achieve your desired goal of a B+, you will need to complete the first two recommendations above. It appears that you have some misconceptions and insufficient master of learning the concept of mean, median, and mode learning objectives.

Projected score with extra effort By completing the recommendations above, your score may improve anywhere between 70% (C-) and 88% (B+) See details Save/email these results to: janedoe@myaccount.com; statsinstuctor@school.com  [Submit]

File Edit Tools

Instructor Dashboard - Professor Doe

Statistics Course:

| Student | Assignment (x-cr) | Score | Time | Weight |
|---|---|---|---|---|
| Jane Doe | Chapter 1, Section 1 | n/a | .3 hours | 3% (.03) |
| | Assignment (Ch. 1.1) | 80% (.8) | .8 hours | 5% (.05) |
| | Tiny Quiz 1 (Ch. 1.1) | 50% (.5) | .5 hours | 5% (.05) |
| | Exam 1.1.2 | 95% (.95) | .8 hours | 10% (.1) |

Current Score: 85% (B)

| | | | | |
|---|---|---|---|---|
| John Doe | Chapter 1, Section 1 | n/a | .7 hours | 3% (.03) |
| | Assignment (Ch. 1.1) | 50% (.5) | .8 hours | 5% (.05) |
| | Tiny Quiz 1 (Ch. 1.1) | 40% (.4) | .9 hours | 5% (.05) |

Current Score: 45% (F)

Instructor Advisor:
Our system includes a set of predictive and prescriptive tools designed to identify students with an likelihood of underperforming in Professor Doe's Statistics course.

Click here to identify groupings of students needing 1:1 tutoring, additional study material, pre-requisite course materials, etc.

FIG. 15

OPTIMIZING USER TIME AND RESOURCES

FIELD OF THE INVENTION

This disclosure relates to the field of systems and methods configured to optimize the time and resources available a user, simulate a user score according to one or more objectives input by the user, and group users according to one or more predicted performance problems related to one or more objectives.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: receive, from a client GUI a request for a recommendation, the request including a designation of available time. The server then queries activity data for the user to identify an objective category associated with the user activity and an assessment score for the user below a defined threshold. The server then queries a recommended activity data, tagged with the identified category and a time requirement equal to or less than the designation of available time. The server then generates a GUI including a report of the assessment score below the threshold and the recommended activity.

In some embodiments, the instructions cause the system to receive, from a client GUI a request for a recommendation, the request including a designation of a desired assessment score. The server then queries activity data for the user to identify an objective category associated with the user activity and an assessment score for the user below a defined threshold. The server then queries a recommended activity data, tagged with the identified category and a score weighting defining an increase to the assessment score. The server then generates a GUI including a report of the assessment score below the threshold and the recommended activity.

In some embodiments, the instructions cause the system to receive, from a client GUI a request for a recommendation, the request including an identification of multiple users. For each of these users, the server then queries activity data to identify an objective category associated with each user activity and an assessment score for the user below a defined threshold. The server then executes a predictive analytics algorithm predicting the assessment score at a future date, and queries a recommended activity data, tagged with the identified category. The server then associates each user with a group identified according to the assessment score and a recommendation, then generates a GUI including a report displaying each group.

The above features and advantages of the present invention will be better understood from the following detailed description taken in conjunction with the accompanying drawings.

BRIEF DESCRIPTION OF THE DRAWINGS

FIG. 5 illustrates a flow diagram for optimizing user time and resources, simulating a user score from input objectives, and/or grouping users by problematic objectives.

FIG. 9 illustrates a non-limiting example GUI for optimizing user time and resources, simulating a user score from input objectives, and/or grouping users by problematic objectives.

FIG. 10 illustrates a non-limiting example GUI for optimizing user time and resources, simulating a user score from input objectives, and/or grouping users by problematic objectives.

FIG. 10B illustrates a non-limiting example GUI for optimizing user time and resources, simulating a user score from input objectives, and/or grouping users by problematic objectives.

FIG. 12 illustrates a non-limiting example GUI for optimizing user time and resources, simulating a user score from input objectives, and/or grouping users by problematic objectives.

FIG. 13 illustrates a non-limiting example GUI for optimizing user time and resources, simulating a user score from input objectives, and/or grouping users by problematic objectives.

FIG. 13D illustrates a non-limiting example GUI for optimizing user time and resources, simulating a user score from input objectives, and/or grouping users by problematic objectives.

FIG. 15 illustrates a non-limiting example GUI for optimizing user time and resources, simulating a user score from input objectives, and/or grouping users by problematic objectives.

DETAILED DESCRIPTION

Figure 1:
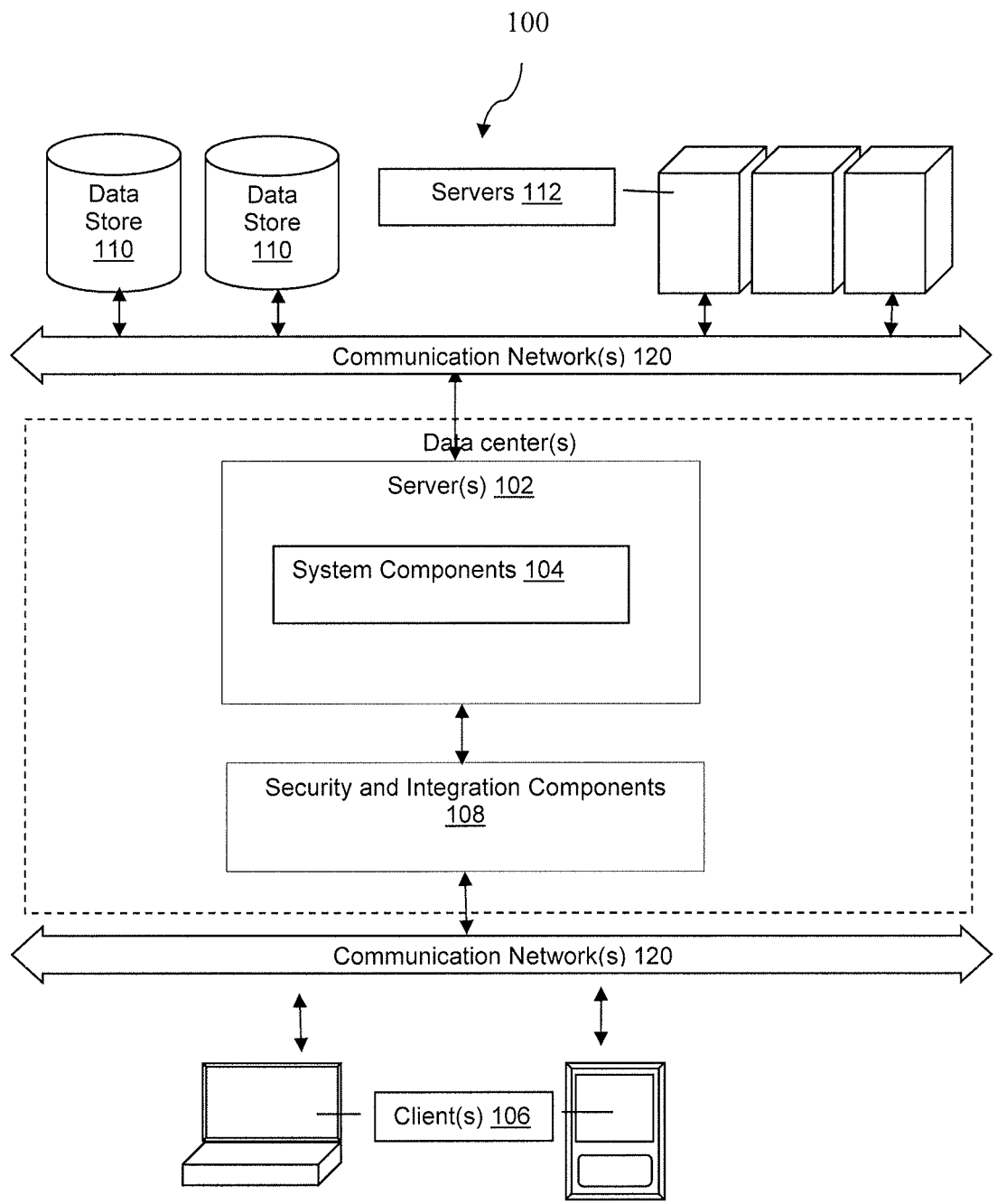
FIG. 1 illustrates a system level block diagram for optimizing user time and resources, simulating a user score from input objectives, and/or grouping users by problematic objectives.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Over time, observations may be made in a learning environment. Learners may struggle with specific learning objectives within the learning environment, but because many learning environments do not personalize the learning experience, may not have the tools needed to improve their skills.

Instructors may recognize the need for improvement, and may try to identify ways the learning environment could be improved. For example, they may take note of specific questions that arise in certain segments of a course, or may begin to provide feedback for other instructors of particularly effective instruction techniques, then observe the effectiveness of these instruction techniques while teaching specific courses.

Instructors may then desire to apply what they have observed and learned, according to a multitude of data points within their learning environment. Unfortunately, even with these observations, the instructors may not have the resources available to gain the necessary insights to determine which learners are struggling, what learning objectives are being missed and why, and specific groupings of learning levels within specific segments of course learners.

Thus, a means is needed to identify weaknesses in specific learning objectives for each of the learners, and to create applications opportunities allowing learners and instructors to identify these gaps and provide instructors with information and/or data about their learners, then recommend to both learners and instructors how to manage remediation requirements required to improve the learning objectives, and provide a support system for both instructors and learners to improve the overall performance of the course.

To address these issues, the disclosed embodiments provide a recommendation engine that shortens the decision making process for the instructor and provides a series of recommendations for individual learners and/or learners within a course as a whole. In some embodiments, the recommendation engine is accessible to users via one or more graphical user interfaces (GUI) to display course data to learners and instructors.

The disclosed system may include one or more server hardware computing devices, one or more client hardware computing devices, and/or one or more data stores communicatively coupled to the network. The data stores may store data, possibly within one or more databases, data tables, data records, data fields, etc. For example, the data store may include, as non-limiting examples: data about each of the instructors (e.g., teacher profiles, possibly including system authentication data, contact data, etc.) within an institution (e.g., a school); data about instruction taught by each of the instructors (e.g., class profiles); data about materials used in each of the classes including: seed data from authors of the materials, data about each learner attending the institution, or within a course (e.g., student profiles, possibly including the learner's name, contact data, system authentication data, etc.); data for each learner about assessment exercises/learning objectives (e.g., work assignments, quizzes, tests, or any other assessment activities), assessment or other activity scores, etc. This data may be utilized in the disclosed embodiments, which include services to optimize the time and resources available a user, simulate a user score according to one or more objectives input by the user, and group users according to one or more predicted performance problems related to one or more objectives A first service in the disclosed embodiments may enable learners to maximize additional study time to optimize performance in a specific course. Learners proactively specify additional study time and the first service provides a series of recommendations based on the learners' available time and their level of mastery for specific Learning Objectives in a course.

This first service analyzes a learner's current profile, including their online activity, learner model, modality and personal time preferences, to recommend optimal learning materials for the learner to study based on a selected number of hours of time. An algorithm compares the learner's profile against content available, time available and time needed to complete learning materials to arrive at the optimal recommendations. Learners may manage their profile and study their recommended material on either web or mobile application.

The software for the first service software may include one or more software modules executed on one or more servers. These software modules may be product platform independent with defined integration points. When a learner enters the application, a client computer may display a summary of current performance in the course. The learner may be given the option to enter and update time preferences in blocks of minutes/hours that can be dedicated to the course. The learner may then be given the option of entering and updating learning preferences for material types (videos, text, quiz, etc.). Upon entering or updating preferences, the learner should be presented with the following results: A list of learning objectives the learner should focus on in descending order of priority by mastery achieved; and simulated performance in the course after additional effort is applied. The learner may then drill down into each learning objective from the recommended study plan, save the simulation and recommendations, and email the recommendation to an account associated with their profile or to an email that they input.

The time needed to work on recommendations should fit into the time specified by the learner. If the optimal recommendation needs more time than the learner provided, an additional prompt may be provided. The learner may share their recommended study plans with their Instructor. The instructor may have the option of assigning extra credit for learner's additional work. Additional work accepted and completed by the learner may be visible in an instructor GUI.

A second service in the disclosed embodiments may be an analysis and recommendation service enabling learners to identify a pathway to achieve a target grade in a specific course. A learner who would like to raise their grade from the current to a target grade may simulate what their grade would be if they complete specific tasks. The system may analyze their performance, identify misconceptions and insufficient mastery of learning objectives and provide recommendations and the amount of extra time per week needed to achieve a target between a current time and an end of a course. Learners can re-run simulations for various targets and times.

The software for the second service may be product platform independent with defined integration points. When a learner enters the application, a client computer may display a summary of current performance in the course. The learner may set target performance by interacting with GUI user input controls. After learners select their desired grade, the system will return with current mastery of learning objectives, and recommendations to improve mastery and time needed. The learner may have a drill down available to access details for the recommended study plans or may be provided with resources to practice each learning item within the recommendations. The learner may save the simulation and recommendations, and may email the recommendation to an account associated with their profile, or to an email input by the learner.

A third service in the disclosed embodiments may be a set of predictive and prescriptive tools designed to enable an instructor to identify learners with a likelihood of underperforming in their course(s). In these embodiments, an Instructor may launch the third service from any software available to the instructor dash, (e.g., a navigation link in a consuming application). The service retrieves all learners within the instructor's course(s), as well as the current performance of each learner, and extracts features needed to execute one or more predictive algorithms to determine expected outcomes. Using these expected outcomes, the recommendation engine above may generate a list of recommendations for each user. Learners in need of Interventions are segregated into groups recommending these different recommendation options, including 1 to 1 tutoring, additional study material, prerequisite course materials, etc. For learners who are not in need of interventions, the instructor may email with the recommendations to an email address in the learner's profile.

The software for the first service software should be product platform independent with defined integration points. This service can be launched from any consuming software or platform, which may run a predictive algorithm based on features and classifiers, and may generate recommendations and segregate learners into groups based on optimal recommendations. The service may display the results on a client computer available to the instructor, including a GUI with a drill down allowing the instructor to view any list of learners. The recommendations may be emailed to a learner or instructor assistant, possibly for 1 to 1 tutoring.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
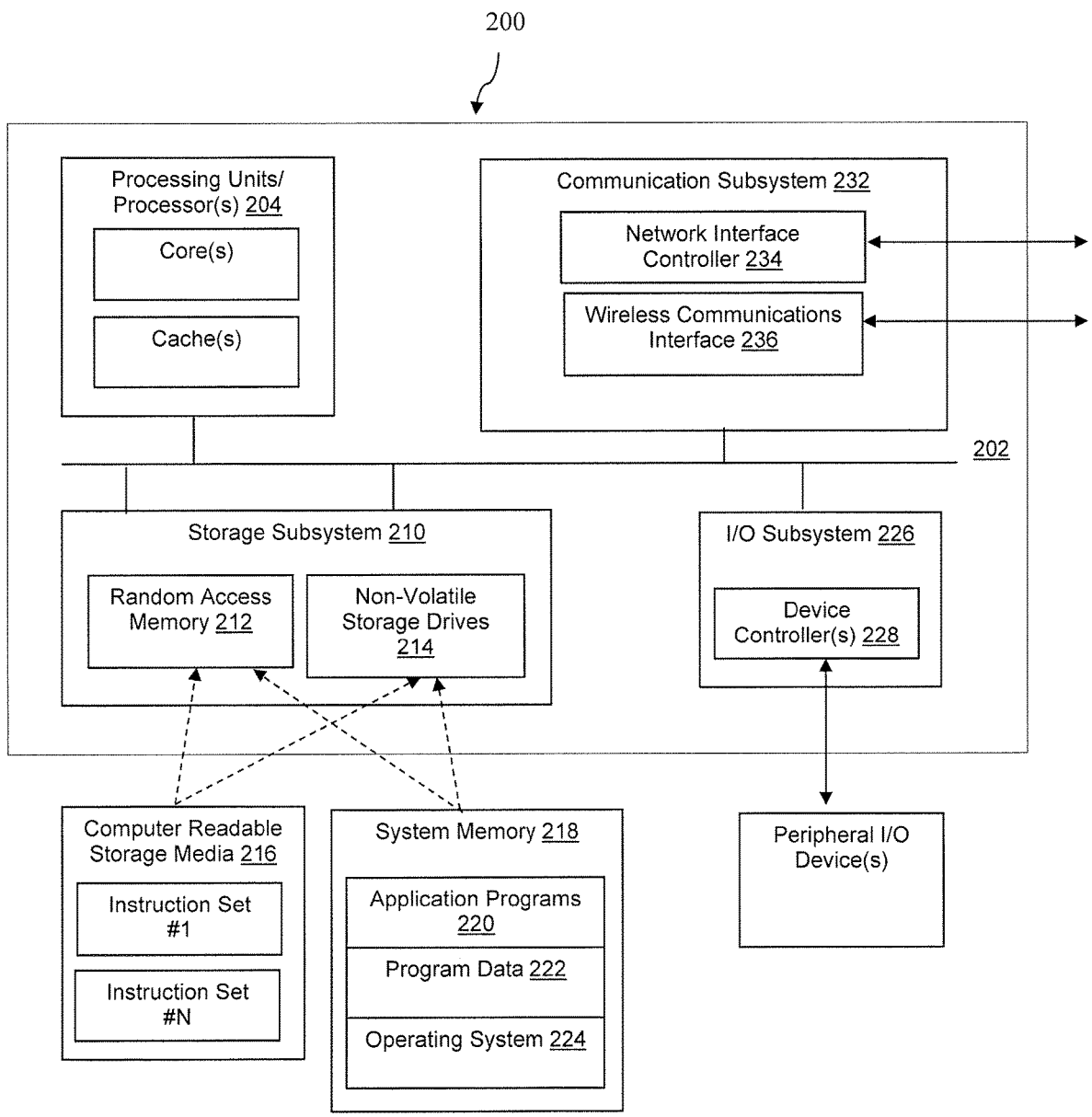
FIG. 2 illustrates a system level block diagram for optimizing user time and resources, simulating a user score from input objectives, and/or grouping users by problematic objectives.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
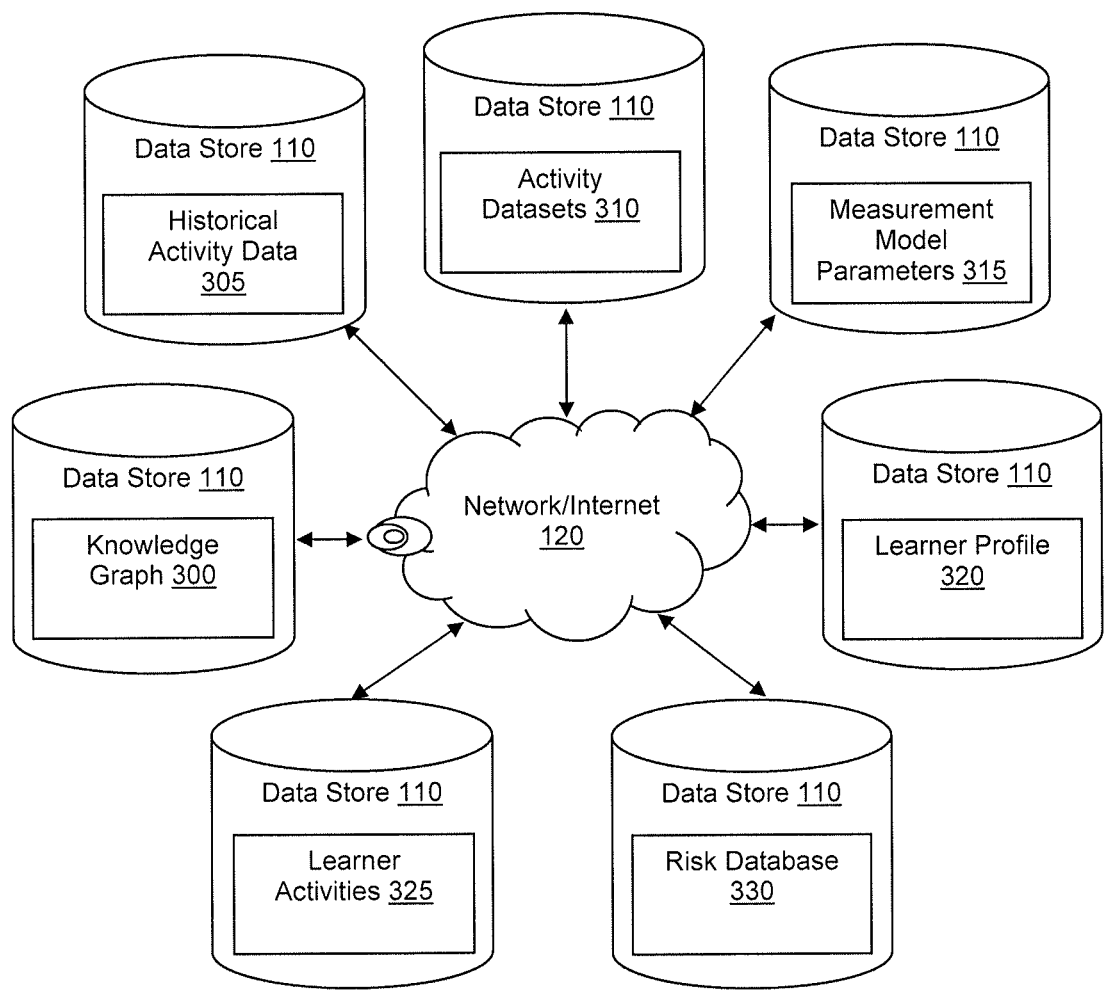
FIG. 3 illustrates a system level block diagram showing a highly distributed data environment for optimizing user time and resources, simulating a user score from input objectives, and/or grouping users by problematic objectives.

FIG. 3 demonstrates a highly distributed non-limiting example embodiment of data stores within the disclosed embodiments. In this highly distributed environment, each of the knowledge graph 300, historical activity data 305, activity datasets 310, measurement model parameters 315, learner profile 320, learner activities 325, and/or risk database 330 data sets may be stored within separate data stores 110, and/or operated on separate servers 112 communicatively coupled to a network as demonstrated in FIG. 4. However, other embodiments (e.g., FIG. 5) may be envisioned, in which any combination of these data stores are stored within a single data store 110, and/or hosted on a single server 112, or are distributed among any combination of data stores 110 or servers 112.

Figure 4:
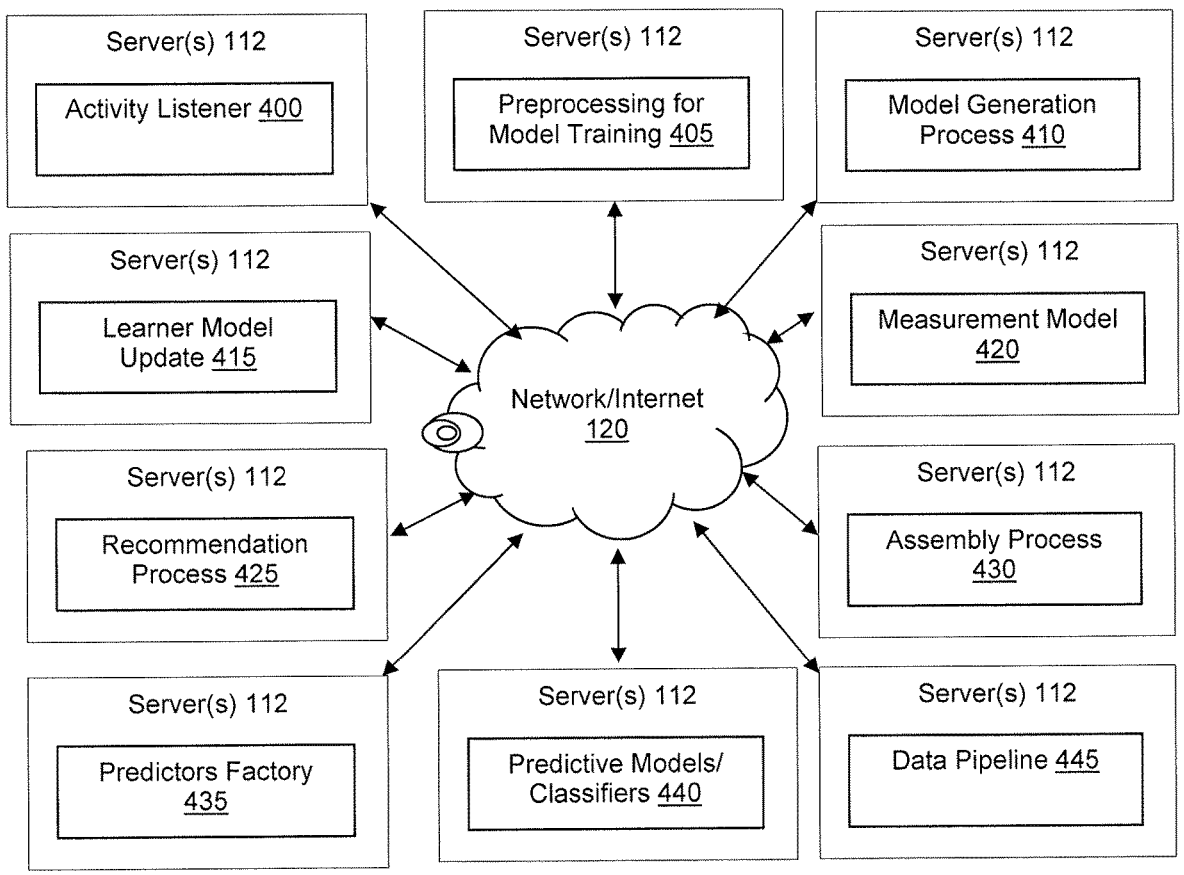
FIG. 4 illustrates a system level block diagram showing a highly distributed software environment for optimizing user time and resources, simulating a user score from input objectives, and/or grouping users by problematic objectives.
Figure 5:
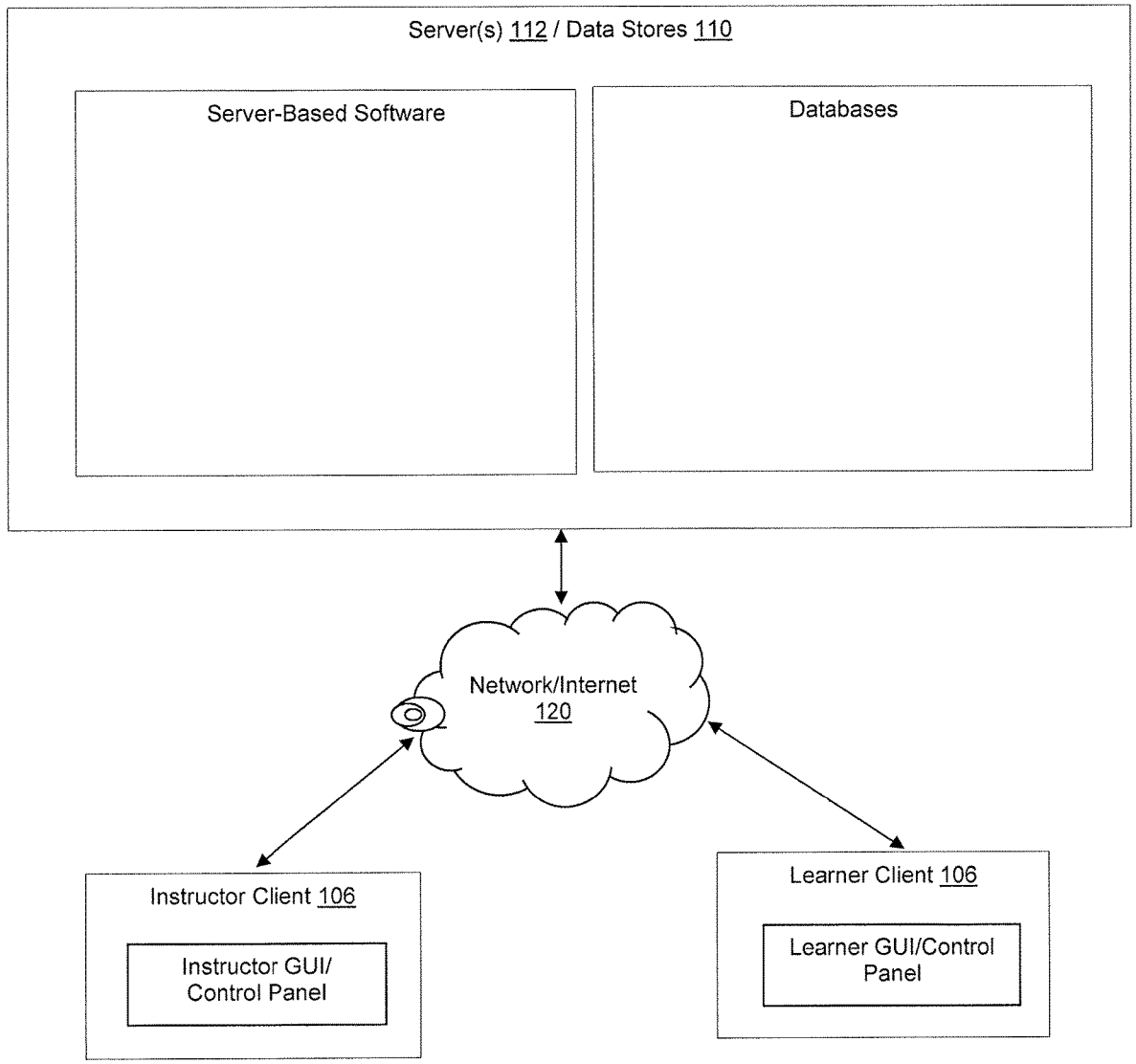
FIG. 5 illustrates a more detailed and system level block diagram showing a consolidated data and software environment for optimizing user time and resources, simulating a user score from input objectives, and/or grouping users by problematic objectives.

FIG. 4 demonstrates a highly distributed non-limiting example embodiment representing servers 110 executing software modules and/or software logic within the disclosed embodiments. In this highly distributed example environment, each of the activity listener 400, processing for model training 405, model generation process 410, learner model update 415, measurement model 420, recommendation process 425, assembly process 430, predictors factory 435, predictive models/classifiers 440, and/or data pipeline 445 software module(s) and/or software logic may be run on separate servers as demonstrated in FIG. 4. However, other embodiments (e.g., FIG. 5) may be envisioned, in which any combination of these software modules or software logic are hosted and/or executed on a single server 112, or are distributed among any combination of servers 112. Each of these software modules and/or software logic may execute according to the method steps described in detail below.

The disclosed embodiments include a plurality of software modules executed on one or more server computers, which may exist as independent (e.g., platform independent) software modules, or as reusable features (e.g., software plugins) that may be integrated or reused within one or more additional, and possibly larger, software applications, possibly in conjunction with each other.

Modifications and adaptations may be necessary to interface or enhance existing software using these software modules. However, the underlying components (e.g., a learner model, the recommendation system disclosed below, and/or a messaging system configured to contact a specific learner or instructor) may be common, regardless of the context in which the software components are used.

The software modules may apply software logic and/or one or more software rules, which may make up the foundational software module components, as well as any specific features for which the foundational software module components are modified.

The disclosed embodiments may store data for users receiving instruction in the disclosed embodiments (e.g., learners). This stored learner data may be associated within data storage with the activity cache, historical activity data 305, activity datasets 310, measurement model parameters 315, learner profile 320, learner activities, 325, learner profile, and/or risk database 330.

Figure 6:
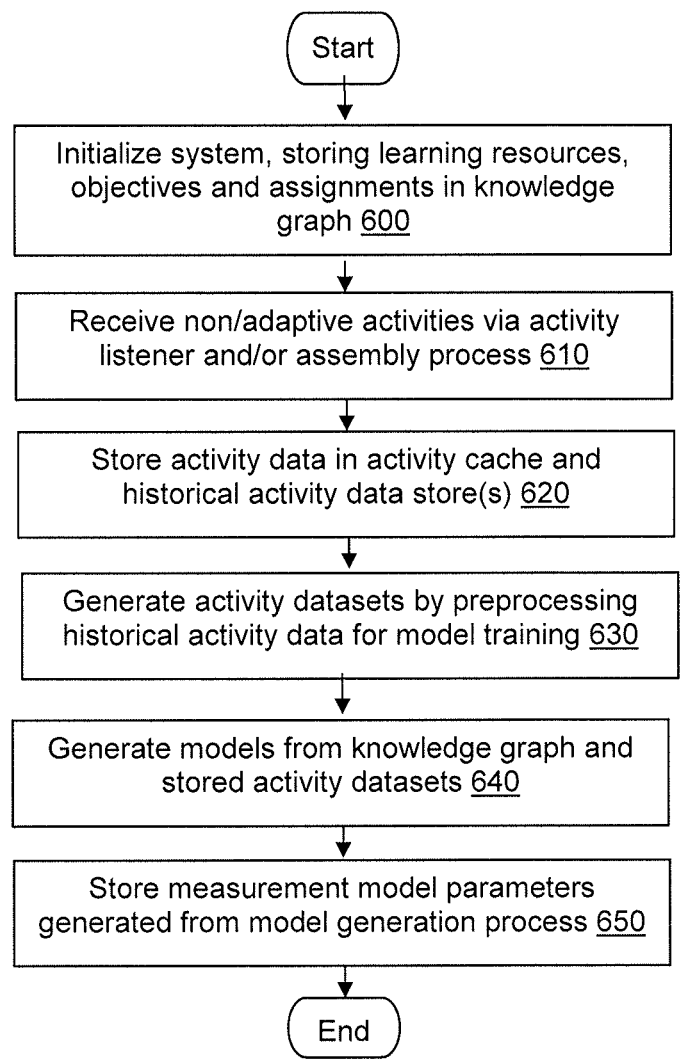
FIG. 6 illustrates a flow diagram for optimizing user time and resources, simulating a user score from input objectives, and/or grouping users by problematic objectives.

The disclosed embodiments may recommend various courses of action to both learners and instructors, using the recommendation engine described below and demonstrated in FIGS. 6-8. The recommendation engine may include an underlying recommendation software engine platform that is common across all of the disclosed software features. An algorithm within the software engine may include one or more business rules. As a non-limiting example, the algorithm driving the software engine may be use Item Response Theory (IRT) algorithm.

Returning to FIG. 6, in step 600, the recommendation system may be initialized using the learning resources, learning objectives, and/or any learner activity materials (e.g., adaptive and/or non-adaptive assignments) stored within data store 110. In some embodiments, the learning resources, learning objectives, and/or learner learning materials may be stored in a knowledge graph data store 300.

Learning resources may include any materials used by the instructor to instruct the learner. As non-limiting examples, learning resources may include electronic textbooks, learning materials (e.g., worksheets or other assignments), multimedia (e.g., video, games, virtual reality interaction, etc.), assessments (e.g., quizzes and tests) any supplemental instruction materials, etc. Each of the learning resources stored within the disclosed system may be associated, within data storage (e.g., using the tag system below), with one or more learning objectives. Thus, content within the disclosed system is typically formed around learning objectives.

These learning objectives may be used to determine a level of progress for each user of the system (e.g., learners). The learning objectives may require the user to apply a number of skill categories and/or learning objectives (e.g., listening, understanding, reading, speaking, writing, vocabulary, grammar, etc. in an English course). These may include "can do" statements requiring a user to apply the learning objectives that define specific skills within each of the skill categories, which must be mastered to achieve a certain score or level. The software logic and/or data records may be associated with one another within the system to define the structure of the tasks required to achieve a specific score or level.

The learning objectives may be associated with each of the learning resources within data storage, possibly using the metadata or other tag based system. Because the disclosed embodiments are highly dependent on the way the data within the system is tagged, each of the learning objectives and/or learning resources may be stored within data storage in association with one or more data tags.

These tags may initially be provided by system administrators and/or learning resource authors. For example, the learning resources provided by the disclosed embodiments may include one or more chapters from an electronic textbook. The author of an electronic textbook may identify, for each of the chapters: one or more prerequisites (e.g., previous chapters, quizzes, tests, or other assessments) that must be completed prior to accessing the chapter; one or more learning objectives associated with the chapter; one or more learning resources and/or activities (e.g., chapter reading, quizzes, tests, or other assessments) associated with the chapter and/or the associated learning objectives; a learning objective level associated with the chapter and/or the associated learning resources; expected time needed to complete the chapter (and/or any section of the chapter) and/or each of the associated learning resources; a weight and/or percentage of a grade to be affected by completing each of the learning resources and/or activities, etc.

The author may then access a GUI (not shown) via a client hardware computing device (client), input the generated learning objective data and learning resources data within the system to include the identified data above, and store the learning objectives, the learning resources, and the associated identified data values described above, possibly as associated data tags, within the system.

The disclosed embodiments may use the metadata tagging system to evaluate and update the tags and learn from the user input to apply the data to generate predictive models and generate recommendations. These calculations are highly dependent on the way data within the system is tagged. Thus, the system may be initially seeded with expert data and tags, and this data, as well as the associated tags, may be continually updated according to the user input received. As learner data is provided, the system may evaluate and update the data associated with each of the tags. The disclosed tag-based system may therefore learn from the predictions and recommendations generated for learners and instructors, as discussed below, and apply the response to these recommendations to future recommendations and/or content generated by the system.

A user may access the disclosed system via any disclosed GUI displayed on the user's client 106 (e.g., FIG. 9-10, 12-13, 15, or 19). If the learner data (e.g., learner profile, historical activity data, activity datasets, measurement of model parameters, etc., disclosed below) does not previously exist, the user may input the data needed for a learner profile 320 (e.g., user name, password, school attended, class, instructor, etc.) within the GUI. The disclosed system may then store the received data, and generate a learner profile 320 for the user.

Returning to FIG. 6, after the system has been initialized by storing the knowledge graph data in the knowledge graph data store 300, in step 610, learners may access the system and complete adaptive and/or non-adaptive activities, which are received by the system as user input.

For example, using the data in the knowledge graph 300, server 112 may generate a course curriculum personalized for a learner. Server 112 may identify the learner (possibly by matching a user authentication attempt to learner profile data 320) and analyze historical activity data 305 for the identified learner.

This analysis may include reviewing the data for activities already completed by the learner, and their performance on these activities. The analysis may further include any incomplete prerequisites for the learner. In other words, server 112 may then identify, based on historical activity data 305, a learning level for the learner, and generate a curriculum for a course according to learning objectives beyond the level successfully completed by the learner.

Server may then automatically generate a personalized course for the learner including all activities for learning objectives, using the associated learning resources, and the learner may move sequentially through the activities generated in association with the personalized course, completing any course prerequisites before moving on to any course successors.

The system may include an activity listener software logic 400 configured to detect any input of data from the user and receive the activities related to learner activity. As described below, these activities may include non-adaptive activities, or adaptive activities.

Thus, returning to FIG. 6, in step 610, server 112 may generate one or more activity GUIs for display on the user's client. As the user interacts with the GUI controls (e.g., doing homework, answering questions via mouse click, etc.), server 112 may process the user input.

Server 112, possibly via activity listener 400 may receive the input activity data, and in step 620, may initially store the activity data in an activity cache data store. Activity listener 400 may then store the input activity data within historical activity data store 305 and/or within the learner profile 320.

In step 630, server 112 may apply preprocessing for model training 405, and store historical activity data 305 and/or preprocessed model training data 405 within activity datasets 310.

In step 640, server 112 may execute a model generation process 410, using the data stored in the activity datasets 310, and combined with the data in knowledge graph 300, may generate models, possibly including activity data models and/or learner models (possibly in combination with the learner profile data 320). Using the generated models, server 112 may generate and store the definitions for one or more measurement model parameters 315 used to automatically generate a measurement model, as described below.

For example, in some embodiments, this model generation process 410 may identify the activities completed by the user, and in response, may automatically determine a list, ordered by most crucial activities to be completed (e.g., prerequisites, related learning resources, etc.).

As learners access the GUIs referenced above, server 112 may receive user input/responses to activities, and determine if the user input matches a correct answer stored within the data stores 110, and may further determine, based on a match, or lack thereof in the database, whether the user input was correct or incorrect.

For incorrect responses, server 112 may identify a learning objective associated with the activity, and model generation process 410 may generate a learner model, wherein the learner input an incorrect selection (and/or a repeated incorrect selection) associated with the activity. Server 112 may store the data from the model (e.g., the user, learning objective, learning resource, correct/incorrect answer, repeated activities, responses, etc. as historical activity data 305 and/or learner profile data 320) in association.

Server 112 may then identify one or more learning resources associated in knowledge graph 300 with the same learning objective for which the user input incorrect responses. The system may therefore identify the efficacy of the content in similar scenarios, and automatically select one or more learning resources configured to provide practice with approximately some probability of improving the user's probability of success. As described herein and seen in step 650, the models generated may be stored as measurement model parameters 315 used to generate a measurement model 420, which calculates and returns the probability of success in response to a request for probability of success from the recommendation process 425, described herein.

Figure 7:
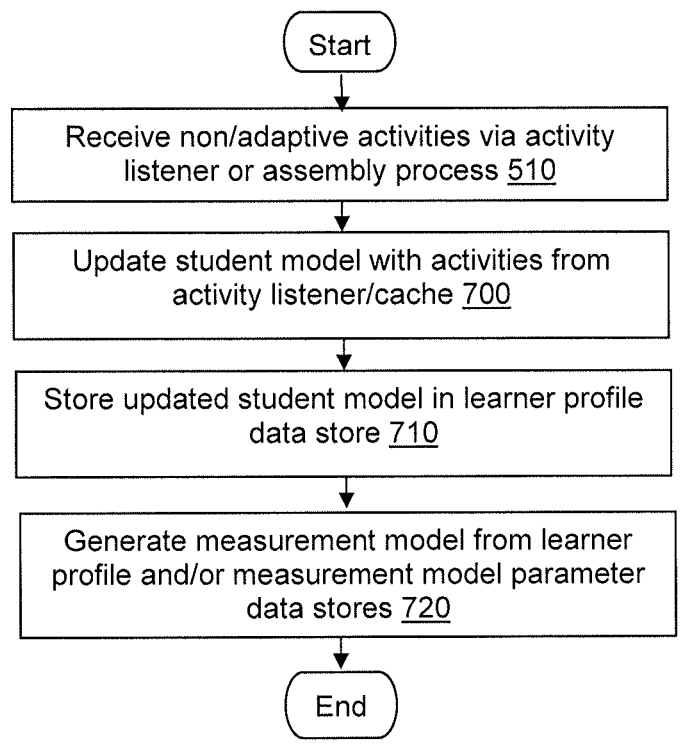
FIG. 7 illustrates a flow diagram for optimizing user time and resources, simulating a user score from input objectives, and/or grouping users by problematic objectives.

Turning now to FIG. 7, in step 510, activity listener 400 may detect any input of data from the user and receive the user input for activities related to the learner activity. The system may then process any combination of the adaptive activities and non-adaptive activities, according to the process for generating definitions for measurement model parameters 315 described above. In embodiments where the input activity is an adaptive activity, the activity listener may receive the activity input directly, or may receive the adaptive activity after processing by software modules and/or a software logic comprising an assembly process 430, described herein.

Thus, as the learner accesses the contents of their personalized course, they may interact with the accessible learner activities generated and displayed on the learner's client 106. As noted above, prior to selecting the activity, the system may determine whether any prerequisites have been completed, and if not, require those to be complete before the user continues. As each user interacts with the displayed GUI (e.g., using a mouse to select multiple choice answers to an assignment, assessment, or other activity) the activity listener 400 may capture all of the user interaction.

Server 112 may then access the knowledge graph 300 to identify one or more learning objectives associated with the learner's current activity, as well as the correct expected input for the activity interaction. Using the input data from the activity screens, server 112 may compare the user input with stored data for correct input to determine correct and/or incorrect input by the user.

For incorrect input, server 112 may identify additional learning resources associated in the knowledge graph 300 with the same learning objective identified in the activity interaction. The activity listener 400 may repeat the process above, and, with each user interaction, store the user's input in the activity cache, historical activity data 305, activity datasets 310, measurement model parameters 315 generated from the model generation process 410, and/or the learner profile 320.

Server 112 may then process the user input data to determine, for example, how many learning objectives included correct or incorrect input by the user, how many of the user interactions included correct input on the first attempt, and for incorrect input, how many times the user had to respond to related learning objectives (e.g., whether the input for those learning objectives was correct and needed to be repeated).

Using the determination of correct and incorrect input, server 112 may automatically calculate a score for the user. No limitations should be placed on the type of scoring for the user. Thus, the score could include a letter grade, a percentage of correct answers, etc. In some embodiments, the calculated score may be a number between 0 and 1, reflecting the abilities and capabilities of the user.

The model generation process 410, may use any combination of the user's activities and/or automatic scores for those activities to generate a learner model, according to any combination of user activity data in the activity cache, the historical activity data 305, the activity datasets 310, or the stored measurement model parameters 315 generated by the model generation process 410. This learner model may be used by the system to demonstrate the efficacy of the non-adaptive activities completed by learners by defining specific attributes of the learner, including current activities, and the abilities of each learner according to user input from activity interactions. This generated learner model may be stored as a learner profile 320, possibly comprising multiple data records.

Server 112 may apply software logic to automatically identify, for each user, specific learning objectives which the user is especially skilled at, and/or learning objectives that are problematic for the user. For example, knowledge graph 300, preprocessing for model training 405, model generation process 410, measurement model parameters 315, and/or measurement model 420 may define a threshold score which, when associated with one or more specific learning objectives, identifies those learning objectives as problematic for that learner. For example, if the system defines a threshold score of 0.7 for a specific learning objective (e.g., "learn the concept of mean, median, and mode" in statistics), and if a user scores an average of 0.6 for activities associated with this specific learning objective, server 112 may identify and flag the learning objective being problematic for that learner. The threshold may be defined and input by system administrators, or calculated using the machine learning techniques described below.

Using the aggregate of activity and learner profile data for all learners, the system may identify patterns within the data to identify strengths and weaknesses of learners for specific learning objectives. The system may further identify general trends for the learners, define averages of the analyzed learners, and learn from these trends to adjust variables within the system (e.g., the defined thresholds, average time required for specific activities, average scores from the aggregate of all learners, etc.). The system may learn from this aggregated data (e.g., content analytics, data weights, etc.), and use this data to generate variables causing the system to perform optimally. Thus, the system variables originally used to seed the system may be dynamically adjusted as additional activity and learner data is received by the system.

Using the analysis from the disclosed system, server 112 may generate recommendations for additional activities, as described below, to: provide a most effective use of available time; recommend the most effective activities to improve a user's current average score based on data weights; and/or recommend groupings for learners, as described in more detail herein.

Server 112 may automatically determine, based on the analyses above, the efficacy of each of the learners, and recommend comparable additional learning resources by identifying items involving related learning objectives, which have the greatest probability of the learner being able to complete, based on the analyses above. For example, if a learner has a score of 0.6 for a specific learning objective, server 112 may suggest prerequisite, or lower level activities to improve the learner's knowledge of the learning objective.

Thus, returning to FIG. 7, in step 700, server 112 may use the input adaptive and/or non-adaptive activity data, and/or learner model data from the model generation process 410 to update a learner model for the user that input the activity data. In step 710, the updated student model may be stored in learner profile 320 in association with learner profile 320, and, as seen in step 720, may be used in generating a measurement model, described herein.

Figure 8:
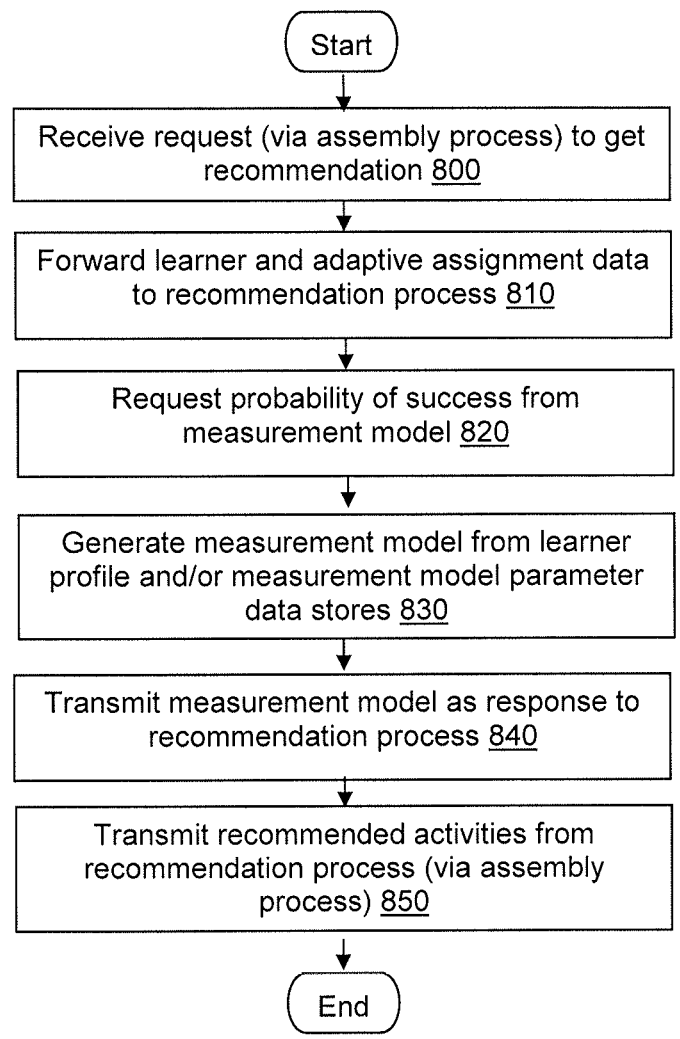
FIG. 8 illustrates a flow diagram for optimizing user time and resources, simulating a user score from input objectives, and/or grouping users by problematic objectives.

FIG. 8 outlines the recommendation process. As a non-limiting example, a user may access one or more GUIs (e.g., FIG. 9-10, 12-13, 15, or 19) to request recommendations. In step 800, the disclosed system may receive the recommendation request, possibly via the assembly process software logic and/or modules 430.

Server 112 may identify the request and user requesting the recommendation, and in step 810, the assembly process 430 may transmit or otherwise forward the user identification, along with any adaptive/assignment data to recommendation process software logic and/or software module(s) 425.

In step 820, one or more recommendation process software modules and/or logic 425 may request the probability of success from measurement model 420, and measurement model 420 may calculate the probability of success, as well as one or more recommended activities, using the recommendation algorithms described herein. Measurement model 420 may then transmit these to recommendation process 425. In step 830, measurement model 420 may generate models from the data in learner profile 320, as well as data in measurement model parameters 315. Using the response from measurement model 420 (Step 840), as well as the data from knowledge graph 300, recommendation process 425 may generate recommended activities, and in step 850, transmit the recommended activities as output to the requesting user, possibly via the assembly process 430.

As described in detail above, the disclosed system may recommend activities according to an analysis of learner models generated from stored learner activity associated with specific learning objectives, and identifying learning resources that will reinforce the learning objectives where the learner is scoring lowest. The recommended activity algorithm may further recommend specific activities according to the amount of time required, the weight on the learner's score, etc. These calculations may determine the most effective recommendations, as described below.

The disclosed embodiments may execute an effort maximizer software logic and/or software module(s) on server 112, as an analysis and recommendation service enabling learners to maximize additional study time to optimize performance in a specific course, so that each learner may manage their profile and study their recommended material. These software modules may be executed as either a web application, executed on one or more servers, or an application for a mobile device, as non-limiting examples. These software modules may be product platform independent with defined integration points.

A learner may access the software application via a learner GUI such as that seen in FIG. 9. The user may authenticate to the system, which may identify the user and access the user's learner profile data 320, and generate and display to the learner a GUI similar to that seen in FIG. 9.

Server 112 may access the measurement model 420 for the learner. Measurement model 420 may analyze the data in the learner profile 320 as described in detail above. Using this measurement model 420, server 112 may generate a learner assessment report, as seen in FIG. 9, according to the user's activity associated with specific learning objectives.

As seen in FIG. 9, the generated report may identify one or more scores for activities associated with learning objectives for which the learner needs improvement. For example, the report may include learner activities in which the learner provided incorrect user input for the activity associated with a specific learning objective.

Server 112 may then generate a GUI to display the generated report, highlighting the learner's problematic learning objective areas, as seen in FIG. 9. In some embodiments (not shown), server 112 may generate, or user may select, color coding to highlight learning objectives for which the learner needs the greatest improvement, or otherwise highlight the activities that they believe are of highest priority. Each learner may access the GUI and review their report and assessment.

As seen in FIG. 9, the report GUI may include a recommendation request form, including one or more GUI controls allowing the learner to select one or more recommendation preferences. As seen in FIG. 9, these GUI controls may allow the user to input learning preferences including: the course for which the recommendations may be generated, a preferred material type (e.g., electronic textbook, video, virtual reality interaction, assessments such as tests or quizzes, etc.), and/or a number of additional study hours that the learner is able to dedicate to the course, thereby allowing learners to proactively specify additional study time.

The user may input the recommendation request preferences at any time, and submit their selections. In the example GUI in FIG. 9, the learner has input 1 hour and 15 minutes of additional study time that they are able to invest.

Server 112 may receive the request recommendation user input and identify it as a recommendation request to maximize or optimize the learner's effort according to available additional study hours. Server 112 may then identify the user requesting the recommendation, and access the appropriate learner profile 320, in order to identify the learner's problematic learning objectives as described above. In some embodiments, assembly process 430 may transmit the user's identity, along with any adaptive/assignment data, to recommendation process 425.

Assembly process 430 may request the recommendations and probability of success from the measurement model 420, which may execute the algorithms to generate a series of recommendations for optimizing the learner's time in order to improve specific learning objectives for a particular course, including a summary of the learner's problematic learning objectives, and recommendations to improve these learning objectives based on the learner's selected available time, as well as a probability of success generated by the measurement model.

Using the recommendation generated by measurement model 420, as well as the data from knowledge graph 300, the recommendation process 425 may generate optimal and personalized recommended learning materials for the learner to study as activities based on the selected amount of time. In some embodiments, the assembly process 430 may output the recommendations to the requesting user. The user's client 106 may display a GUI such as that seen in FIG. 10, which recommends an exam, a quick review, an assignment, and a tiny quiz, ordered from most to least effective.

The learner may then drill down into each learning objective from the displayed recommended study plan. For example, in FIG. 10, the learner may click on each of the recommendations to view a display of details outlining specific study plans or other resources available for each learning objective in their list of recommendations. Thus, learners can choose which of the displayed activities they want to practice in order to raise their grade. As seen in FIG. 10, each of the activities will add a specific weight of impact on the grade.

As seen in FIG. 10, the GUI may include a summary of the learner's projected score with extra effort. The combinations of the generated and displayed recommendations with the summary of the projected score with extra effort may provide an overview of where the learner may focus to improve their overall score.

For example, in FIG. 10, by clicking on the "see details" link, the learner may be provided with a detailed breakdown of the effect of each of the recommendations on the learner's score. In this example, the detailed list may include directions so that if the learner wants to do all of the recommendations, they may get an A or B, but if they wanted to just get a B, they could do the first two or three recommendations listed (ordered by highest priority), etc.

In FIG. 10, the displayed list of recommendations include only those recommendations that may be completed during the time specified by the learner. However, the GUI may include a note that additional, and possibly more optimal, recommendations are available if the user has more time. In FIG. 10, the learner may click a link to access a list of recommendations and/or update the time available to complete them.

As seen in FIG. 10, the learner may save the simulation and recommendations, re-run simulations for various targets and times, and/or email the recommendation to an email account associated with their profile, or may share their recommended study plans with their Instructor, who may assign extra credit for the learner's additional work. Additional work accepted and completed by the learner may be displayed on an instructor dashboard, as seen in FIG. 15.

Figure 10B:
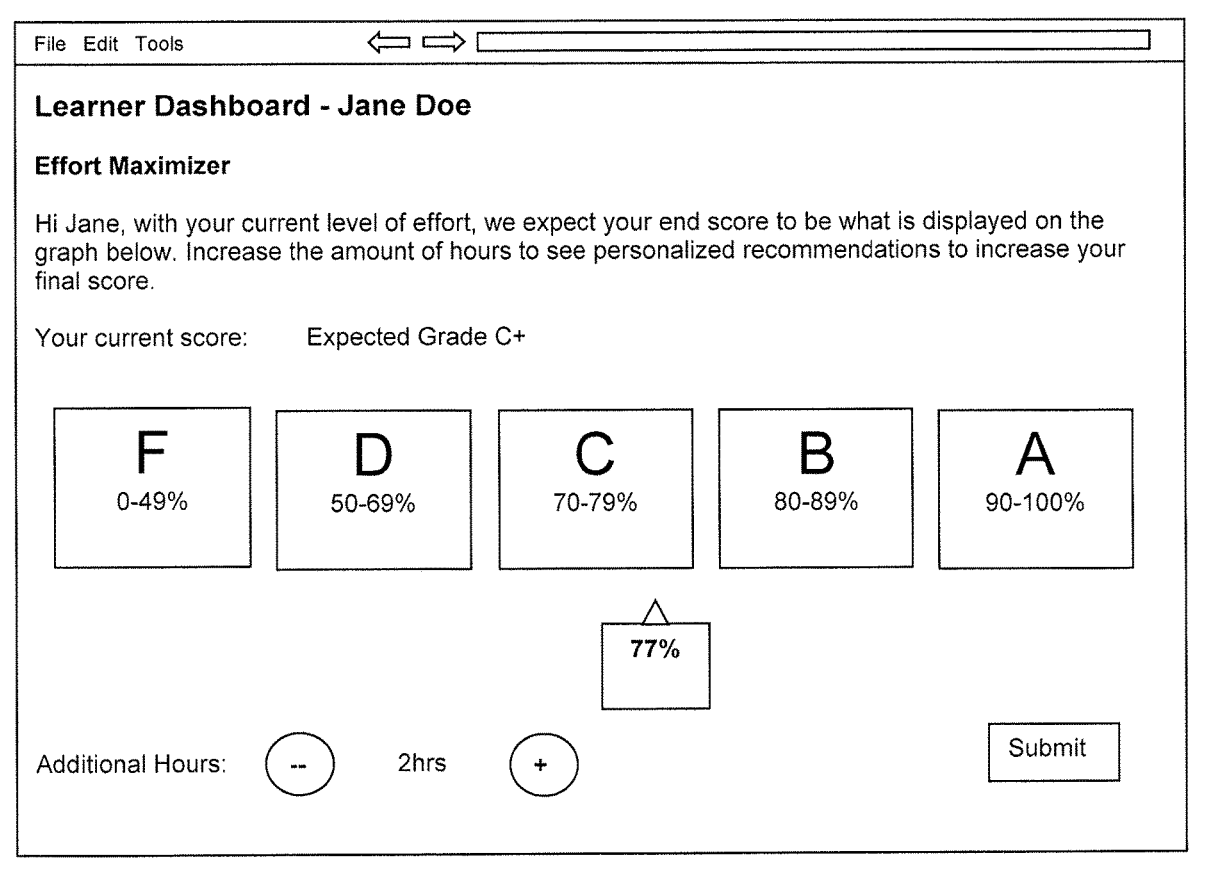

FIG. 10B represents an embodiment of the GUI that may be displayed to the learner. In this non-limiting example embodiment, the GUI may display a graph, projecting to the learner the expected end score according to the learner's current level of effort. The GUI may then display the expected end score, possibly using a slider such as that seen in FIG. 10B (e.g., slider at 77%, representing a C+ in this example). As seen in FIG. 10B, the user may interact with one or more GUI controls (e.g., the plus and minus buttons displayed in FIG. 10B), allowing the user to increase (or decrease, respectively), the amount of hours available for the learner, which may be displayed in response to the user input (e.g., 2 hrs). The learner may then submit the user input to server 112 for analysis and processing.

Figure 10C:
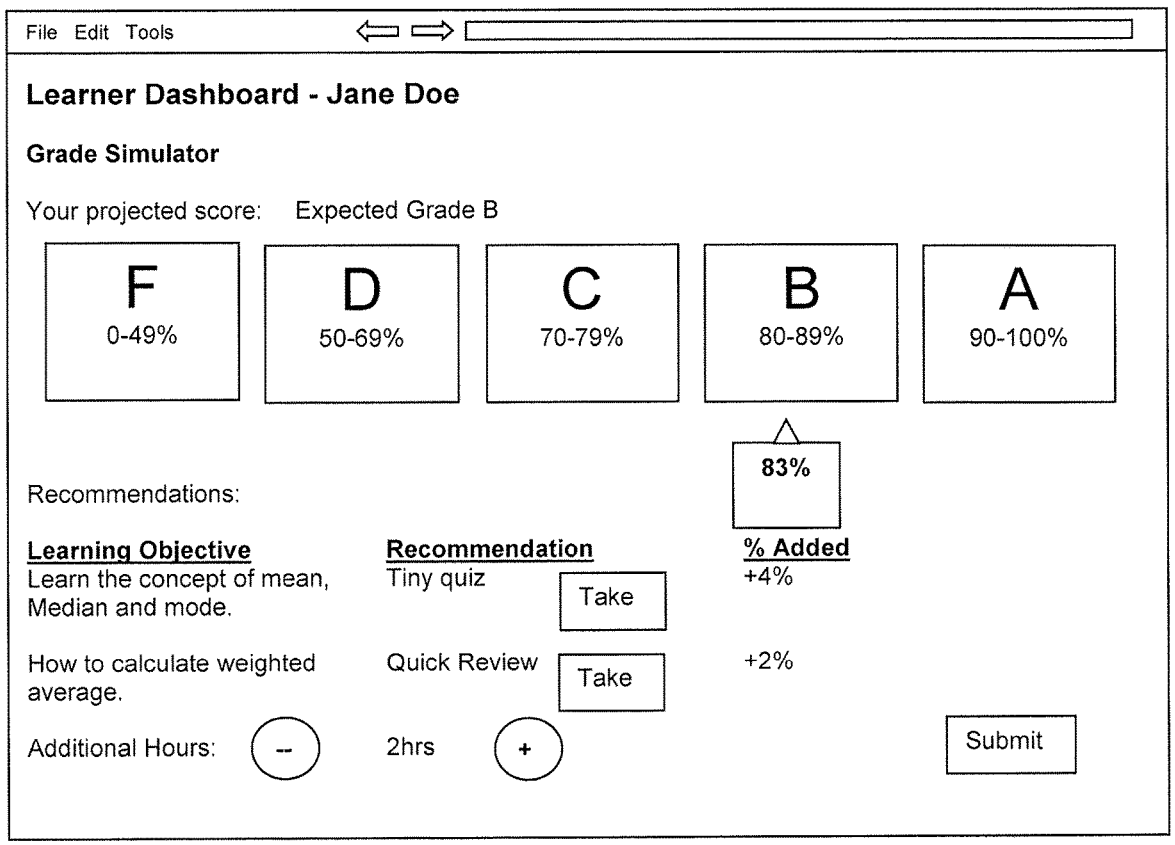
FIG. 10C illustrates a non-limiting example GUI for optimizing user time and resources, simulating a user score from input objectives, and/or grouping users by problematic objectives.

Server may receive the user input and execute the method steps described herein, automatically generating a second GUI such as that seen in FIG. 10C. This automatically-generated GUI may display the learner's expected grade (in this case a B), as well as a graphical representation of the projected score, possibly using a slider adjusted to the appropriate score and associated letter grade, as seen in FIG. 10C. The second GUI may further include the generated suggestion, including the learning objective, recommendation, and percentage added to the grade for each of the completed learning objectives. In addition, the automatically-generated GUI may display a GUI control (e.g., "Take" buttons) allowing the learner to access the displayed recommendations.

Figure 11:
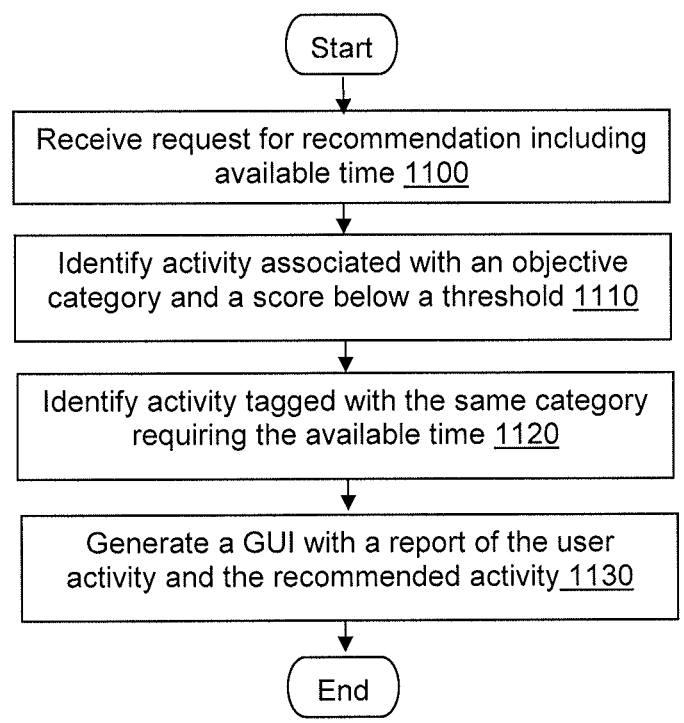
FIG. 11 illustrates a flow diagram for optimizing user time and resources, simulating a user score from input objectives, and/or grouping users by problematic objectives.

In summary, FIG. 11 demonstrates a process including method steps executed by server 112. In step 1100, server 112 receives, from a GUI displayed on a client 106, a recommendation request transmission encoding a designation of available time. In step 1110, server 112 queries a user activity data, associated in a data store with the user, identifying: a user activity associated in the data store with a category for an objective; and an assessment score for the user activity below a predefined threshold. In step 1120, server 112 queries a recommended activity data, comprising at least one data tag associating at least one recommended activity, with: the category; and a time requirement equal to or less than the designation of available time. In step 1130, server 112 automatically generates a second GUI displaying: a report highlighting the at least one user activity including an assessment score below the predefined threshold; and the at least one recommended activity.

The disclosed embodiments may execute a grade simulator software logic and/or software modules on server 112, as an analysis and recommendation service enabling learners to identify a pathway to achieve a target grade in a specific course, so that the learner may simulate specific tasks needed to raise their grade from their current grade to a target grade. These software modules may be executed as either a web application, executed on one or more servers, or an application for a mobile device, as non-limiting examples. These software modules may be product platform independent with defined integration points.

A learner may access the software application via a learner GUI such as that seen in FIG. 12. The user may authenticate to the system, which may identify the user and access the user's learner profile data 320, and generate and display to the learner a GUI similar to that seen in FIG. 12.

Server 112 may access the measurement model 420 for the learner. Measurement model 420 may analyze the data within learner profile 320 as described in detail above. Using this measurement model 420, server 112 may generate a learner assessment report according to the user's activity associated with specific learning objectives.

As seen in FIG. 12, the generated report may identify one or more scores for activities associated with learning objectives for which the learner needs improvement. For example, the report may include learner activities in which the learner provided incorrect user input for the activity, associated with a specific learning objective.

Server 112 may then generate a GUI to display the generated report, highlighting the learner's problematic learning objectives, as seen in FIG. 12. In some embodiments (not shown), server 112 may generate, or user may select, color coding to highlight learning objectives for which the learner needs the greatest improvement, or otherwise highlight the activities that they believe are of highest priority. Each learner may access the GUI and review their report and assessment.

As seen in FIG. 12, the report GUI may include a recommendation request form, including one or more GUI controls allowing the learner to select one or more recommendation preferences. As seen in FIG. 12, these GUI controls may allow the user to input learning preferences including: the course for which the recommendations may be generated, a preferred material type (e.g., electronic textbook, video, virtual reality interaction, assessments such as tests or quizzes, etc.), and/or a desired grade that the learner would like to achieve (possibly input via a GUI slider control, or a dropdown GUI control as seen in FIG. 12). The disclosed GUI therefore provides a means for a learner to understand their current score for a course, and select a preferred score to improve their final score for the course.

The user may input the recommendation request preferences at any time, and submit their selections. In the example GUI in FIG. 12, the learner has input a desired course score of between 87% (0.87), and 89% (0.89), which would earn the learner a B+ in the selected statistics course.

Server 112 may receive the request recommendation user input and identify it as a recommendation request to generate a list of recommendations allowing the learner to achieve their input desired score for the course. Server 112 may then identify the user requesting the recommendation, and access the appropriate learner profile 320, in order to identify the learner's problematic learning objectives as described above. In some embodiments, assembly process 430 may transmit the user's identity, along with any adaptive/assignment data, to recommendation process 425.

Assembly process 430 may request the recommendations and probability of success from measurement model 420, which may execute the algorithms for generating a series of recommendations allowing the learner to improve specific learning objectives, thereby achieving their desired input score for the course, including a summary of the learner's problematic learning objectives. The series of recommendations may improve the identified learning objectives based on the learner's selected desired score in the course, as well as a probability of success generated by the measurement model.

Recommendation process 425 may then provide a series of recommendations based on the learners' desired input score for the course and their level of mastery for specific learning objectives within the selected course. Recommendation process 425 may provide assembly process 430 with the recommended activities, including the following results:

A list of learning objectives the learner should focus on in descending order of priority by mastery achieved; and simulated performance in the course after additional effort is applied.

Using the recommendation generated by measurement model 420, as well as the data from knowledge graph 300, recommendation process 425 may generate optimal and personalized recommended learning materials for the learner to study as activities based on the selected desired score for the course. In some embodiments, assembly process 430 may output the recommendations to the requesting user. The user's client 106 may display a GUI such as that seen in FIG. 13, which recommends an exam, a quick review, an assignment, and a tiny quiz, ordered from most to least effective, which the learner may complete to reach the input desired score for the course. As seen in FIG. 13, the displayed GUI may specify which of the listed recommendations the learner must complete to achieve the input desired score for the course.

The learner may then drill down into each learning objective from the displayed recommended study plan. For example, in FIG. 13, the learner may click on each of the recommendations to view a display of details outlining specific study plans or other resources available for each learning objective in their list of recommendations. Thus, learners can choose which of the displayed activities they want to practice in order to raise their grade. As seen in FIG. 13, each of the activities will add a specific weight of impact on the grade As seen in FIG. 13, the GUI may include a summary of the learner's projected score with extra effort. The combinations of the generated and displayed recommendations with the summary of the projected score with extra effort may provide an overview of where the learner may focus to improve their overall score.

For example, in FIG. 13, by clicking on the "see details" link, the learner may be provided with a detailed breakdown of the effect of each of the recommendations on the learner's score, including directions so that if the learner wants to do all of the recommendations, they may get the input desired grade of a B+, but if they wanted only to raise their grade to a C, they could complete only the first two or three recommendations listed (ordered by highest priority), etc.

As seen in FIG. 13, the learner may save the simulation and recommendations, re-run simulations for various targets and times, and/or email the recommendation to an email account associated with their profile. The learner may further share their recommended study plans with their Instructor, who may assign extra credit for the learner's additional work. Additional work accepted and completed by the learner may be displayed on an instructor dashboard, as seen in FIG. 15.

Figure 13B:
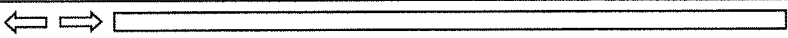
FIG. 13B illustrates a non-limiting example GUI for optimizing user time and resources, simulating a user score from input objectives, and/or grouping users by problematic objectives.
Figure 13C:
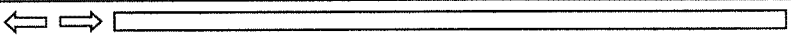
FIG. 13C illustrates a non-limiting example GUI for optimizing user time and resources, simulating a user score from input objectives, and/or grouping users by problematic objectives.

FIG. 13B represents an embodiment of a GUI that may be displayed to the learner. In this non-limiting example embodiment, the GUI may display a graph, projecting to the learner the expected end score according to the learner's current level of effort. The GUI may then display the expected end score, possibly using a slider such as that seen in FIG. 13B (e.g., slider at 77%, representing a C+ in this example). As seen in FIG. 13B-13C, the user may interact with one or more GUI controls (e.g., the slider, which may move along the graph, as displayed in FIGS. 13B and 13C), allowing the user to increase or decrease their desired grade, in response to the user input (e.g., the user sliding the desired grade from 77% to 85%) the system may calculate and display to the user the improvement goal that the system should set, in this case, an 8% improvement goal. The learner may then submit the user input to server 112 for analysis and processing.

Figure 13D:
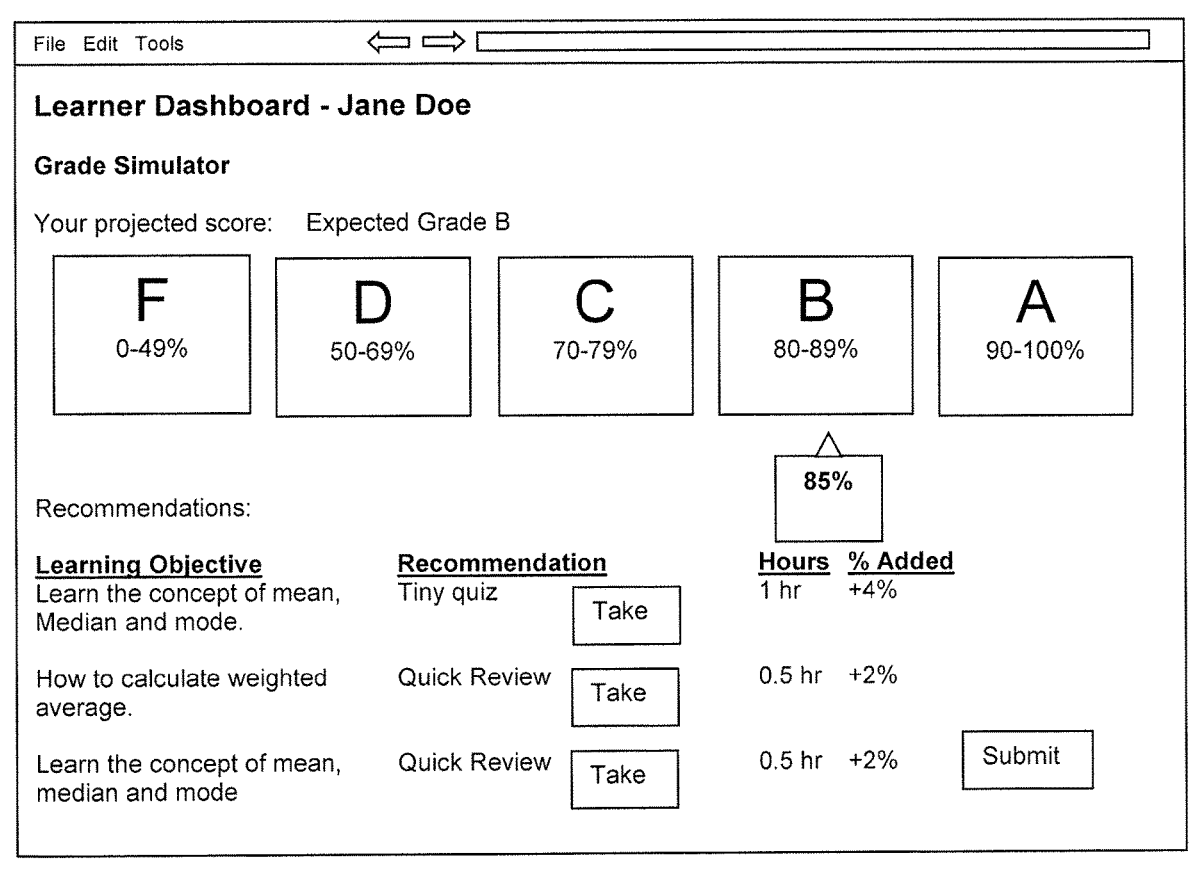

Server may receive the user input and execute the method steps described herein, automatically generating a second GUI such as that seen in FIG. 13D. This automatically-generated GUI may display the learner's expected grade (in this case a B), as well as a graphical representation of the projected score, possibly using a slider adjusted to the appropriate score and associated letter grade, as seen in FIG. 13D. The second GUI may further include the generated suggestion, including the learning objective, recommendation, hours required, and percentage added to the grade for each of the completed learning objectives. In addition, the automatically-generated GUI may display a GUI control (e.g., "Take" buttons) allowing the learner to access the displayed recommendations.

Figure 14:
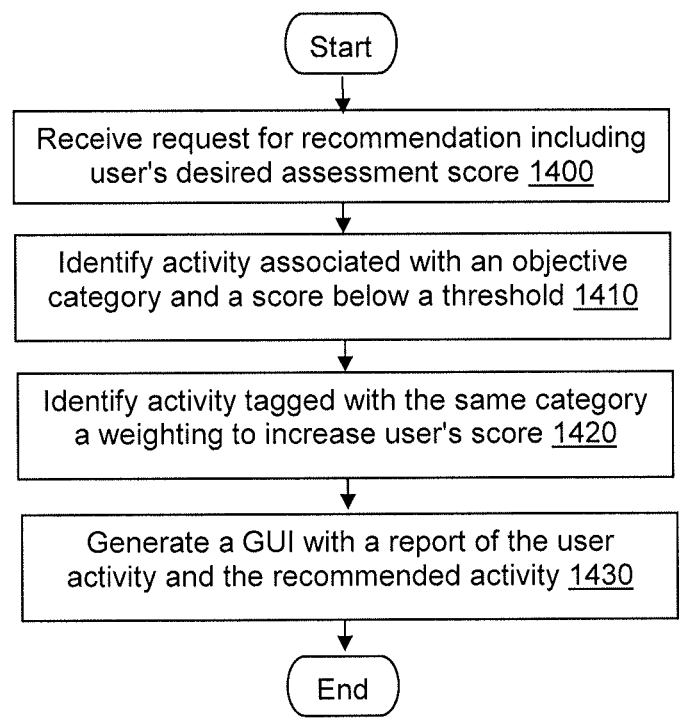
FIG. 14 illustrates a flow diagram for optimizing user time and resources, simulating a user score from input objectives, and/or grouping users by problematic objectives.

In summary, FIG. 14 demonstrates a process including method steps executed by server 112. In step 1400, server 112 receives, from a GUI displayed on a client 106, a recommendation request transmission encoding a desired assessment score. In step 1410, server 112 queries a user activity data, associated in a data store with the user, identifying: a user activity associated in the data store with a category for an objective; and an assessment score for the user activity below a predefined threshold. In step 1420, server 112 queries a recommended activity data, comprising at least one data tag associating at least one recommended activity, with: the category; and a score weighting defining an increase to the assessment score. In step 1430, server 112 automatically generates a second GUI displaying: a report highlighting the at least one user activity including an assessment score below the predefined threshold; and the at least one recommended activity.

The disclosed embodiments may execute an instructor advisor software logic and/or software modules on server 112, as a set of predictive and prescriptive tools designed to enable an Instructor to identify learners with a likelihood of underperforming in their course(s), so that the instructor may manage their profile for the course. These software modules may be executed as either a web application, executed on one or more servers, or an application for a mobile device, as non-limiting examples. These software modules may be product platform independent with defined integration points.

This instructor advisor may build a reusable advisor functionality providing actionable insights to ensure that instructors have as much granular information about learners and their courses, as well as intervention models allowing learners to improve their performance in specific learning objectives, thereby improving the course and possibly the associated institution. The returned identification and recommendations may assist the instructor in determining how to prioritize time, what kind of content or remediation materials to provide to specific learners, and how to help them improve their understanding of specific learning objectives.

An instructor may access the software application via an instructor GUI such as that seen in FIG. 15. The user may authenticate to the system, which may identify the user and access the user's instructor profile data, which may include associations between the instructor, the course, and for each learner within the course, the learner's profile data 320. Server 112 may then generate and display to the instructor a GUI similar to that seen in FIG. 15.

Server 112 may access measurement model 420 for each of the learners identified to be within the instructor's course.

Measurement model 420 may analyze the data in each learner profile 320 as described in detail above. Using measurement model 420, server 112 may generate a learner assessment report for each learner in the course according to the user's activity associated with specific learning objectives.

As seen in FIG. 15, the generated report may identify one or more scores for activities associated with learning objectives for which each learner needs improvement. For example, the report may include learner activities in which each learner provided incorrect user input for the activity, associated with a specific learning objective.

FIG. 15 demonstrates the generated and displayed report for each learner in the instructor's course, highlighting each learner's problematic learning objectives, and further highlighting extra credit work completed by the learners. In some embodiments (not shown), server 112 may generate, or user may select, color coding to highlight learning objectives for which each learner needs the greatest improvement. The instructor may then access the GUI and review the report for their selected course.

As seen in FIG. 15, any instructor GUI, software, or other consuming application may include a link allowing the instructor to identify learners predicted to struggle with specific learning objectives, generate recommendations to improve their score in the course as outlined above, and group learners with similar problematic learning objective areas, while simultaneously generating remedying recommendations.

Figure 16:
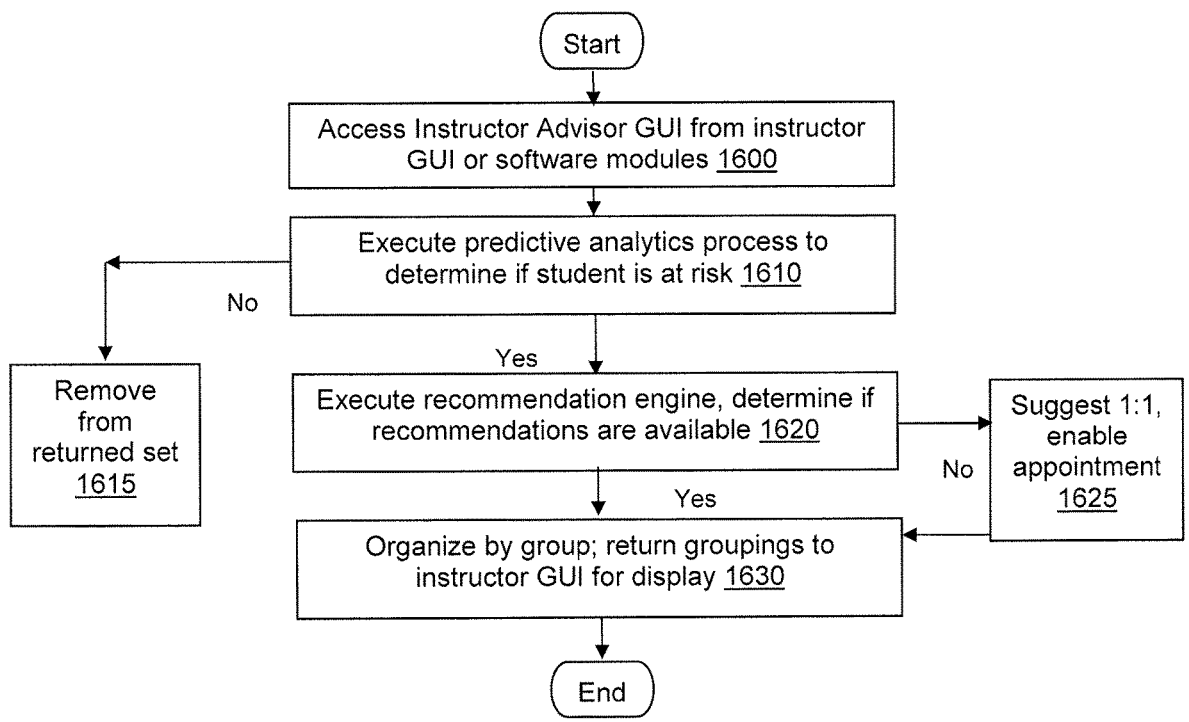
FIG. 16 illustrates a flow diagram for optimizing user time and resources, simulating a user score from input objectives, and/or grouping users by problematic objectives.

Turning now to FIG. 16, in response to the instructor's input requesting the instructor advisor software in step 1600, in step 1610, server 112 may execute a predictive process algorithm in order to determine any learners within the course that may be at risk. In step 1615, if a determination is made that any learners are not at risk, server 112 may remove the learners determined not to be at risk from any returned data set.

Figure 17:
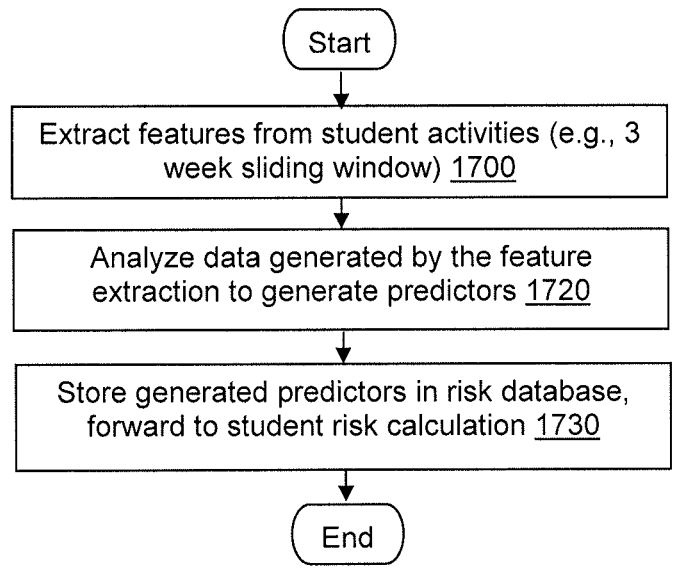
FIG. 17 illustrates a flow diagram for optimizing user time and resources, simulating a user score from input objectives, and/or grouping users by problematic objectives.
Figure 18:
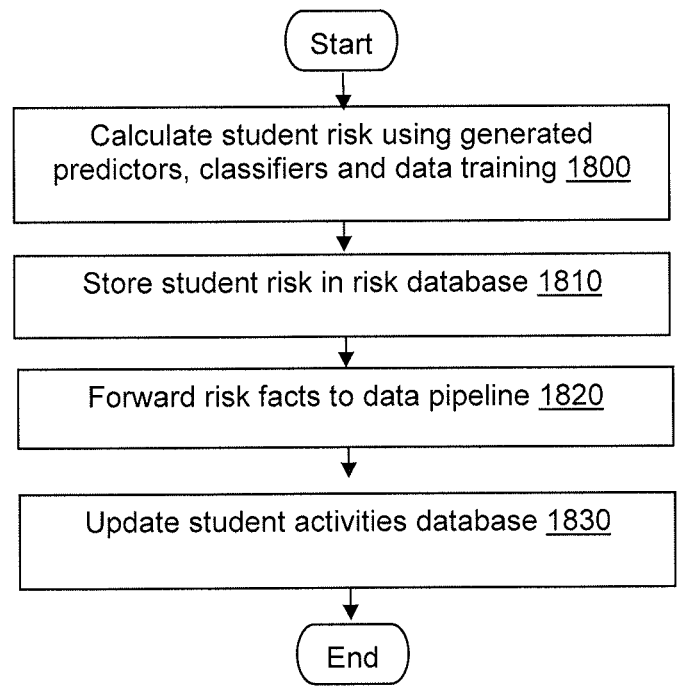
FIG. 18 illustrates a flow diagram for optimizing user time and resources, simulating a user score from input objectives, and/or grouping users by problematic objectives.

Turning now to FIGS. 17-18, a predictive analytics platform used to predict and identify the learners that may be at risk may include logic for two separate software modules, including a first features extraction and predictors factory software 435 configured to extract features from learner activities in order to generate predictors, and a second predictive classifiers and models software 440 configured to create classifiers, and use data training, as well as the predictors generated from the features extraction and predictors factory 435 to calculate and generate one or more learner risk models.

Risk database 330 may be populated both from the predictors generated from the features extraction and predictors factory 435, as well as by the learner risk model data generated by the predictive classifiers and models software 440.

FIG. 17 is a flow diagram representing a non-limiting process of extracting the features and generating predictors, which may be stored in risk database 330, as well as forwarded to the predictive classifiers and models software 440 for use in the learner risk calculation generating the learner risk model.

The predictive analytics platform may include a learner activities database 325, storing learner activities, interactions, and learner performance for each of the learning objectives for each learner's courses. Returning to step 1700 of FIG. 17, the feature extraction algorithm may utilize any known technology (e.g., Apache Spark), to receive a collection of all learner activities and learner performance for all learners over a specified time period (e.g., all learner activities for all courses for all learners over a sliding window of 3 weeks).

The feature extraction and predictors factory 435 may then extract features from the performance data received from learner activities database 325. As non-limiting examples, the extracted information may include CFA/Hurst Coefficients, slopes of net scores, average homework scores, average test scores, average problem part scores, problem part attempts, average attempts per part, etc. Server 112 may then analyze the received learner activity and performance data, possibly in light of course configuration profiles and course level feature normalizations. In step 1720, the feature extraction and predictors factory 435 may generate the predictors by analyzing the extracted learner activity and performance data in conjunction with the course configuration profiles and course level features normalizations. In step 1730, server 112 may store the generated predictors in risk database 330, and forward them to the predictive classifiers and models software 440 to calculate the learner risk.

Turning now to FIG. 18, the predictive classifiers and models software 440 may execute a predictive algorithms to determine expected outcomes for each of the learners, or for the course as a whole. In step 1800, server 112 may use the predictors generated by the features extraction and predictors factory 435, as well as one or more classifiers, and data training/machine learning in order to run a predictive algorithm used to calculate learner risk according to the generated predictors, classifiers, and data training. The classifiers may include linear and/or random forest classifiers.

For example, a learner risk calculator may utilize one or more classifiers, as well as a certain set of generated predictors in order to generate a report for each learner within a course outlining each learner's current and predicted performance within the course, as well as their final score for the course, according to the learning objectives that will likely be the most problematic.

The machine learning may utilize an aggregation of learners, and follow a continuous loop wherein the system learns from each of the learners' activities and performance, as well as user input in response to recommendations made to the learners, in order to determine an optimal model of learner risk. The system may continue to learn from each of these transactions, continually determining whether the recommendations presented to users are optimal, and if not, continually updating the generated models according to the feedback the system receives.

In step 1810, server 112 may store the calculated learner risk, as well as any associated data, in risk database 330. In step 1820, server 112 may forward one or more risk facts associated with the learner risk calculation to a data pipeline 445. The data in this data pipeline 445 may be made available to various consuming applications via the risk database 330, possibly via one or more remote procedure calls an application programming interface (API). Utilizing the data in the data pipeline, in step 1830, the disclosed system may update the learner activities database 325.

Returning now to FIG. 16, in step 1600, any consuming software, including any instructor GUI may access the described instructor advisor software, and in step 1610, the disclosed system may execute the predictive analytics process described in detail above. In step 1615, the system may remove each learner determined not to be at risk (e.g., high performance in all learning objectives, predicted to have high performance overall in the course), and remove them from the returned data set.

In step 1620, for each learner determined to be at risk, the learner risk data generated and stored in risk database 320 may be used as input to the recommendation engine, which may be executed as described in detail above. For example, the recommendation engine may generate, for each at-risk learner, a personalized list of recommendations according to each learner's activity data, representing an optimal use of the learner's time and resources to maximize improvement to each learner's final score in the course.

In some embodiments, 1 to 1 in-person intervention and/or tutoring may be available, allowing an in person meeting between the instructor (or an instructor's assistant) and each learner. Thus, in step 1625, in these embodiments, the system may recommend this 1 to 1 interaction where appropriate.

In step 1630, server 112 may divide and organize the at-risk learners for the course into groups according to either predicted eventual outcomes for the course generated by the predictive analysis (e.g., like abilities, average predicted final score, problematic learning objectives, etc.), and/or by common highest recommendations provided by the recommendation engine (e.g., exams, assignments, quizzes, etc.).

Figure 19:
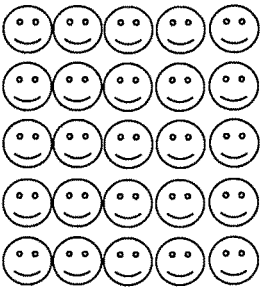
FIG. 19 illustrates a non-limiting example GUI for optimizing user time and resources, simulating a user score from input objectives, and/or grouping users by problematic objectives.

Server 112 may then generate an instructor GUI displaying the groupings of learners in the course, and/or including a listing of the learners in each of the groupings, thereby shortening the decision making process for study plan options available to the instructor (e.g., 1:1 review, flashcards, etc.) and providing a series of recommendations for individual learners or for whole groups of learners, as seen in FIG. 19. In the embodiment shown in FIG. 19, the instructor may drill down to any group, or any individual within each group.

As seen in FIG. 19, the instructor may save the simulation and recommendations, re-run simulations for various targets and times, and/or email the recommendation (or details for any recommended 1 to 1 review, tutoring or other intervention meeting) to an email account associated with their (or an assistant's) profile, or a profile for the learner. Additional work accepted and completed by the learner may be displayed on an instructor dashboard, as seen in FIG. 15.

Figure 19B:
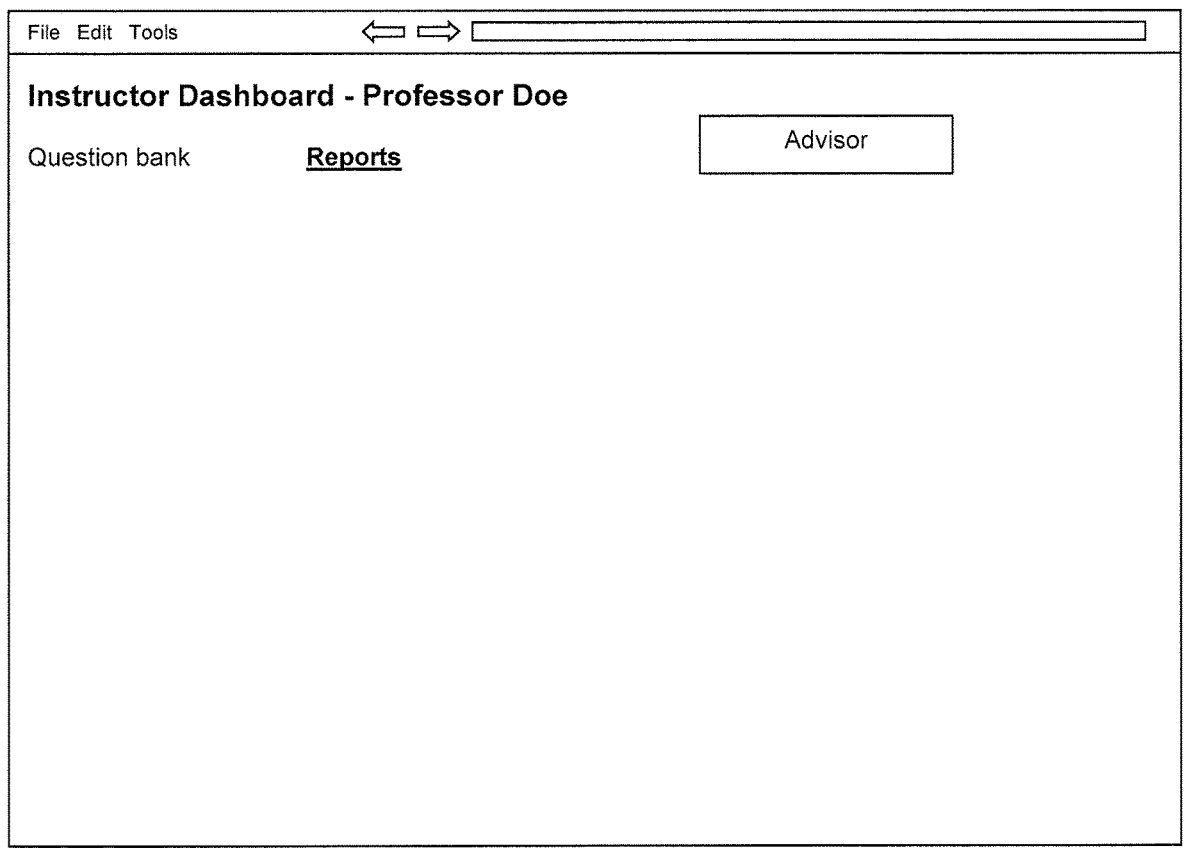
FIG. 19B illustrates a non-limiting example GUI for optimizing user time and resources, simulating a user score from input objectives, and/or grouping users by problematic objectives.
Figure 19C:
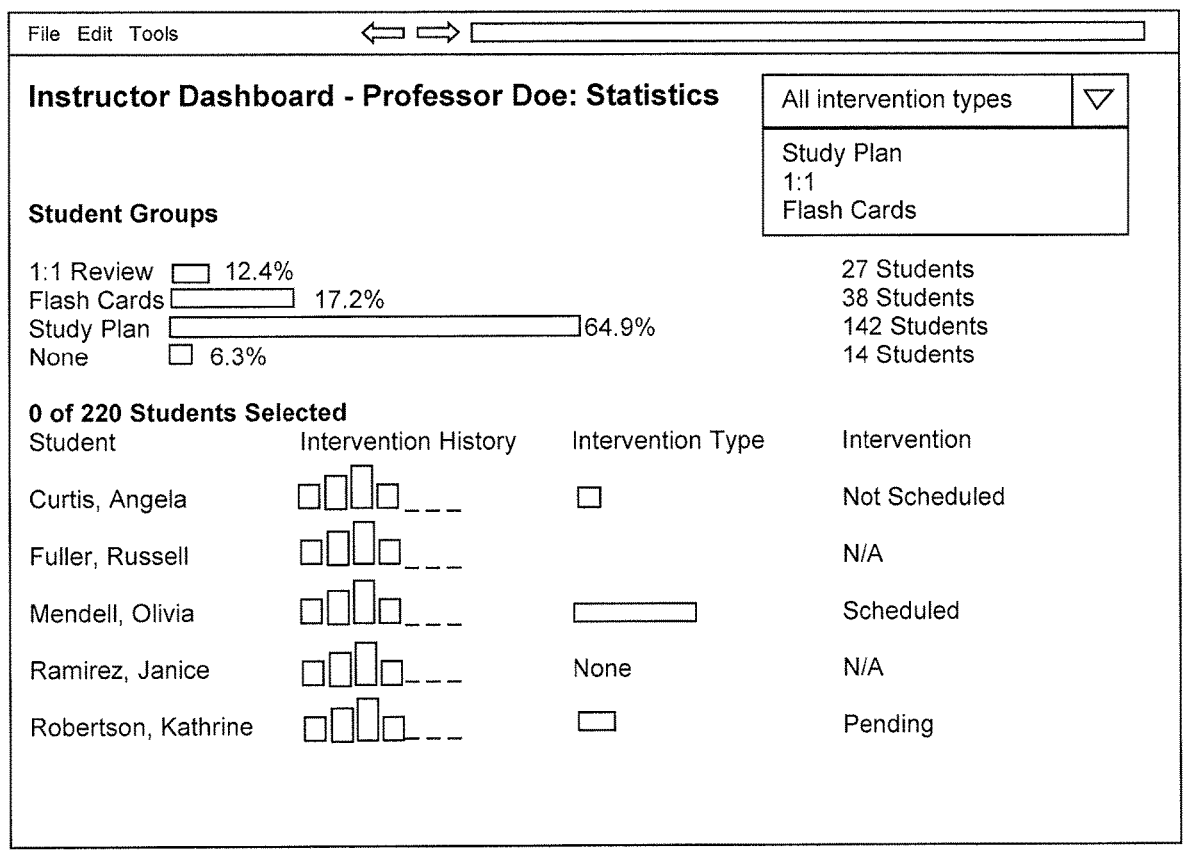
FIG. 19C illustrates a non-limiting example GUI for optimizing user time and resources, simulating a user score from input objectives, and/or grouping users by problematic objectives.

FIG. 19B represents an embodiment of a GUI that may be displayed to the instructor, allowing them to access an instructor advisor (e.g., using a button in the non-limiting example in FIG. 19B). In response, server may execute the method steps disclosed herein, and generate a report to the instructor, including the groupings as described above. The non-limiting example report in FIG. 19C allows the instructor to select the type of groupings. For example, using the displayed dropdown menu, the instructor may select all intervention types, or only the groupings including study plans, 1:1, or flash cards. In response to the selection, the GUI may display the student groups, as well as a percentage and/or number of students from the class that are associated with that group. As seen in FIG. 19C, graphical representations may help the instructor to quickly review the information. The report may further provide and display a breakdown of an intervention history, an intervention type (both of which are displayed graphically in FIG. 19C, as well as the status of the intervention itself (e.g., "not scheduled," "N/A," "Scheduled," or "Pending" as seen in FIG. 19C).

Figure 20:
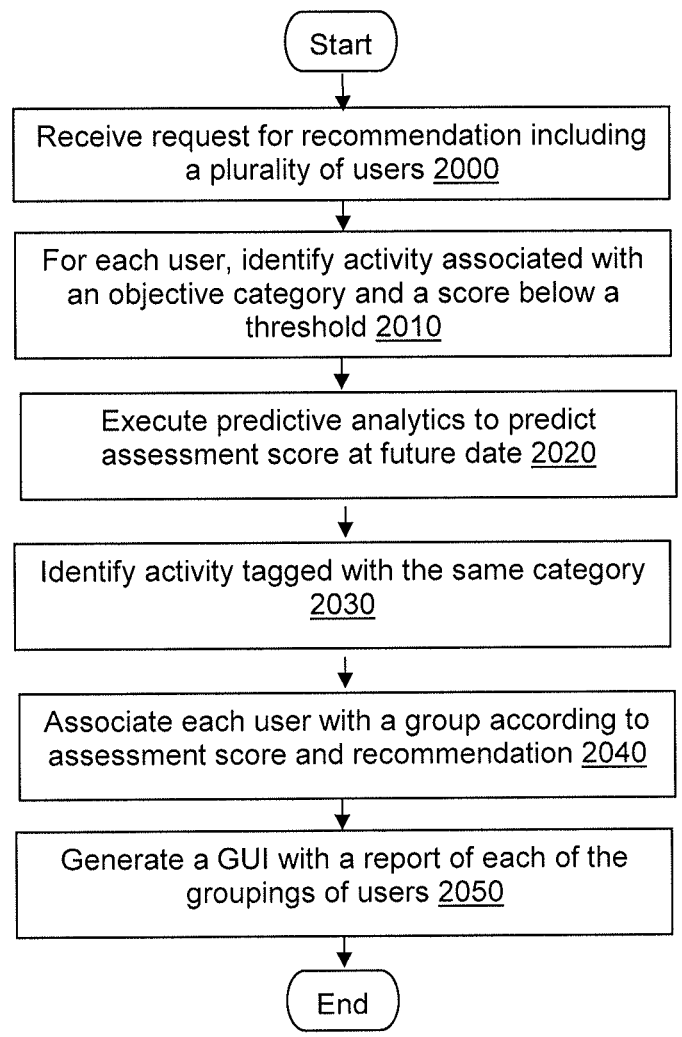
FIG. 20 illustrates a flow diagram for optimizing user time and resources, simulating a user score from input objectives, and/or grouping users by problematic objectives.

In summary, FIG. 20 demonstrates a process including method steps executed by server 112. In step 2000, server 112 receives, from a GUI displayed on a client 106, a recommendation request transmission identifying a plurality of users. In step 2010, for each of the plurality of users, server 112 queries a user activity data, associated in a data store with each user, identifying: a user activity associated in the data store with a category for an objective; and an assessment score for the user activity below a predefined threshold. In step 2020, server 112 executes a predictive analysis data logic predicting the assessment score at a future date. In step 2030, server 112 queries a recommended activity data, comprising at least one data tag associating at least one recommended activity, with the category. In step 2040, server 112 associates each of the plurality of users with a group within a plurality of groups, the group being identified according to: the assessment score; or at least one recommendation within the recommendation data. In step 2050, server 112 automatically generates a second GUI displaying each of the plurality of groups.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising a server hardware computing device coupled to a network and comprising at least one processor executing instructions within memory that, when executed, cause the system to:
   receive, from a first graphical user interface (GUI) displayed on a client hardware computing device operated by a user, a recommendation request transmission encoding a designation of available time;
   query a user activity data, associated in a data store with the user, identifying:
      a plurality of user activities associated in the data store with a category for an objective; and
      an assessment score for each of the plurality of user activities below a predefined threshold;
   generate:
      a plurality of data sets, each data set in the plurality of data sets including an identifier for the user, an activity in the plurality of user activities, and the assessment score for the activity;
      from the plurality of data sets:
         a measurement model personalized to the user; and
         at least one parameter for the measurement model;
   identify, according to the measurement model and the at least one parameter, a problem category for the user;
   query a recommended activity data, comprising at least one data tag associating at least one recommended activity, with:
      the problem category;
      a weight, assigned by an author of the at least one recommended activity defining, for each of the at least one recommended activity, an increase to an aggregated score for the plurality of assessment scores that exceeds the predefined threshold; and
      a time requirement equal to or less than the designation of available time; and
   generate a list, personalized to the user, of the at least one recommended activity ordered according to a likelihood, determined by the measurement model and the weight, of increasing the aggregated score if each of the at least one recommended activity is completed;

automatically generate a second GUI displaying:
   a report highlighting the at least one user activity including an assessment score below the predefined threshold; and
   the at least one recommended activity.

2. The system of claim 1, wherein:
the user activity data is associated with a subject;
the recommendation request includes a selection of the subject; and
the recommended activity data comprises at least one data tag associating the recommended activity with the subject.

3. The system of claim 1, wherein:
the recommendation request includes a preferred content format; and
the recommended activity data comprises at least one data tag associating the recommended activity with the preferred content format.

4. The system of claim 1, wherein the instructions further cause the system to:
receive user input, comprising the user activity data, from the user;
store the user activity data in the data store in association with the user;
generate, from the user activity data, a user profile model including the assessment score.

5. The system of claim 4, wherein the instructions further cause the system to:
receive user input from the user comprising a user recommended activity data;
store the user recommended activity data in the data store in association with the user;
update the user profile model to include the user recommended activity data and a user recommended activity assessment score.

6. The system of claim 5, wherein the instructions further cause the system to identify the recommended activity data according to the user activity data and the user profile model.

7. The system of claim 1, wherein the second GUI includes at least one GUI control configured to:
save the report and the at least one recommended activity; and
transmit an email with the report and the at least one recommended activity.

8. The system of claim 1, wherein the report includes a projected assessment score resulting from a completion of the at least one recommended activity.

9. The system of claim 1, wherein the report includes the at least one recommended activity associated in the recommended activity data with a plurality of recommended activities not associated with the time requirement equal to or less than the designation of available time.

10. A method comprising the steps of:
receiving, by a server hardware computing device coupled to a network and comprising at least one processor executing specific computer-executable instructions within a memory, from a first graphical user interface (GUI) displayed on a client hardware computing device operated by a user, a recommendation request transmission encoding a designation of available time;
querying, by the server hardware computing device, a user activity data, associated in a data store with the user, identifying:
   a plurality of user activities associated in the data store with a category for an objective; and
   an assessment score for each of the user activities below a predefined threshold;
generating, by the server hardware computing device:
   a plurality of data sets, each data set in the plurality of data sets including an identifier for the user, an activity in the plurality of user activities, and the assessment score for the activity;
   from the plurality of data sets:
      a measurement model personalized to the user; and
      at least one parameter for the measurement model;
identify, according to the measurement model and the at least one parameter, a problem category for the user;
querying, by the server hardware computing device, a recommended activity data, comprising at least one data tag associating at least one recommended activity, with:
   the problem category;
   a weight, assigned by an author of the at least one recommended activity defining, for each of the at least one recommended activity, an increase to an aggregated score for the plurality of assessment scores that exceeds the predefined threshold; and
   a time requirement equal to or less than the designation of available time; and
generating, by the server hardware computing device, a list, personalized to the user, of the at least one recommended activity ordered according to a likelihood, determined by the measurement model and the weight, of increasing the aggregated score if each of the at least one recommended activity is completed;
automatically generating, by the server hardware computing device, a second GUI displaying:
   a report highlighting the at least one user activity including an assessment score below the predefined threshold; and
   the at least one recommended activity.

11. The method of claim 10, wherein:
the user activity data is associated with a subject;
the recommendation request includes a selection of the subject; and
the recommended activity data comprises at least one data tag associating the recommended activity with the subject.

12. The method of claim 10, wherein:
the recommendation request includes a preferred content format; and
the recommended activity data comprises at least one data tag associating the recommended activity with the preferred content format.

13. The method of claim 10, further comprising the steps of:
receiving, by the server hardware computing device, user input, comprising the user activity data, from the user;
storing, by the server hardware computing device, the user activity data in the data store in association with the user;
generating, by the server hardware computing device, from the user activity data, a user profile model including the assessment score.

14. The method of claim 13, further comprising the steps of:
receiving, by the server hardware computing device, user input from the user comprising a user recommended activity data;

storing, by the server hardware computing device, the user recommended activity data in the data store in association with the user;

updating, by the server hardware computing device, the user profile model to include the user recommended activity data and a user recommended activity assessment score.

15. The method of claim 14, further comprising the step of identifying, by the server hardware computing device, the recommended activity data according to the user activity data and the user profile model.

16. The method of claim 10, wherein the second GUI includes at least one GUI control configured to:

save the report and the at least one recommended activity; and transmit an email with the report and the at least one recommended activity.

17. The method of claim 10, wherein the report includes a projected assessment score resulting from a completion of the at least one recommended activity.

18. The method of claim 10, wherein the report includes the at least one recommended activity associated in the recommended activity data with a plurality of recommended activities not associated with the time requirement equal to or less than the designation of available time.

19. The system of claim 1, the instructions further causing the system to:

receive, a second recommendation request transmission, comprising a user selection of a plurality of users;

query the user activity data for each of the plurality of users;

generate the plurality of data sets, the measurement model, and the at least one parameter for each of the plurality of users;

identify, according to the measurement model and the at least one parameter, the problem category for each of the plurality of users;

associate each of the plurality of users with a group within a plurality of groups, the group being identified according to:

the problem category identified for each of the plurality of users associated with the group;

the assessment score; and at least one recommendation within the recommended activity data;

automatically generate a third GUI displaying each of the plurality of groups, wherein the third GUI is configured to receive a second user selection of at least one of the plurality of groups.

20. The method of claim 1, further comprising the steps of:

receiving, by the server hardware computing device, a second recommendation request transmission, comprising a user selection of a plurality of users;

querying, by the server hardware computing device, the user activity data for each of the plurality of users;

generating, by the server hardware computing device, the plurality of data sets, the measurement model, and the at least one parameter for each of the plurality of users;

identifying, by the server hardware computing device, according to the measurement model and the at least one parameter, the problem category for each of the plurality of users;

associating, by the server hardware computing device, each of the plurality of users with a group within a plurality of groups, the group being identified according to:

the problem category identified for each of the plurality of users associated with the group;

the assessment score; and at least one recommendation within the recommended activity data;

automatically generating, by the server hardware computing device, a third GUI displaying each of the plurality of groups, wherein the third GUI is configured to receive a second user selection of at least one of the plurality of groups.

* * * * *